(12) United States Patent
     Van Os

(10) Patent No.: US 11,656,737 B2
(45) Date of Patent: May 23, 2023

(54) ADDING A CONTACT TO A HOME SCREEN

(71) Applicant: Apple Inc., Cupertino, CA (US)

(72) Inventor: Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 16/143,306

(22) Filed: Sep. 26, 2018

(65) Prior Publication Data

US 2019/0026009 A1    Jan. 24, 2019

Related U.S. Application Data

(63) Continuation of application No. 12/170,295, filed on Jul. 9, 2008, now Pat. No. 10,095,375.

(51) Int. Cl.
*G06F 3/04817*     (2022.01)
*H04M 1/72457*    (2021.01)
(Continued)

(52) U.S. Cl.
CPC ........ *G06F 3/04817* (2013.01); *G06F 3/0482* (2013.01); *H04L 67/52* (2022.05);
(Continued)

(58) Field of Classification Search
CPC .............. G06F 3/0482; G06F 3/04817; G06F 3/04847; G06F 1/1632; G06Q 10/10;
(Continued)

(56) References Cited

U.S. PATENT DOCUMENTS 4,143,810 A    3/1979  Greenaway
5,379,057 A    1/1995  Clough et al.
(Continued)

FOREIGN PATENT DOCUMENTS

CN    1254139 A    5/2000
CN    1405728 A    3/2003
(Continued)

OTHER PUBLICATIONS

Vincent et al., "Real Estate Icon Placement", IP.com No. IPCOM000169417D, Apr. 15, 2008, copyright Motorola Inc. 2008, pp. 1-3 (Year: 2008).*
(Continued)

*Primary Examiner* — Andrew L Tank
(74) *Attorney, Agent, or Firm* — Kubota & Basol LLP

(57) ABSTRACT

An icon can be created for a contact (e.g., an individual(s) or an entity) and presented on a user interface of a mobile device, such as a "home screen." The icon can be used to retrieve and display contact information. The icon can also be used to invoke one or more applications that are personalized to the contact. The icon can be modified to display information related to the contact. In one aspect, an icon associated with an entity can be temporarily displayed on the mobile device based on the proximity of the mobile device to the entity. The icon can be used to retrieve and display information related to the entity. Additionally, the icon can be removed from the display on the mobile device when the mobile device is no longer within a certain proximity of the entity.

18 Claims, 14 Drawing Sheets

(51) Int. Cl.
*H04L 67/52* (2022.01)
*H04M 1/72448* (2021.01)
*H04W 4/02* (2018.01)
*G06F 3/0482* (2013.01)
*G06Q 30/02* (2012.01)
*H04L 51/52* (2022.01)
*G06Q 30/0251* (2023.01)

(52) U.S. Cl.
CPC ... *H04M 1/72448* (2021.01); *H04M 1/72457* (2021.01); *H04W 4/02* (2013.01); *G06Q 30/0261* (2013.01); *H04L 51/52* (2022.05)

(58) Field of Classification Search
CPC ............ G06Q 10/107; G06Q 30/0261; H04M 1/72572; H04M 15/8066; H04M 1/72457; H04M 1/72448; H04L 67/34; H04L 51/52; H04L 67/52; H04W 4/02
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,579,472 A | 11/1996 | Keyworth, II et al. | |
| 5,675,362 A | 10/1997 | Clough et al. | |
| 5,825,352 A | 10/1998 | Bisset et al. | |
| 5,835,079 A | 11/1998 | Shieh | |
| 5,880,411 A | 3/1999 | Gillespie et al. | |
| 5,963,964 A | 10/1999 | Nielsen | |
| 6,084,951 A | 7/2000 | Smith et al. | |
| 6,091,956 A * | 7/2000 | Hollenberg | H04W 4/029 |
| | | | 455/456.5 |
| 6,188,391 B1 | 2/2001 | Seely et al. | |
| 6,202,055 B1 | 3/2001 | Houvener et al. | |
| 6,310,610 B1 | 10/2001 | Beaton et al. | |
| 6,323,846 B1 | 11/2001 | Westerman et al. | |
| 6,333,973 B1 | 12/2001 | Smith et al. | |
| 6,414,696 B1 * | 7/2002 | Ellenby | G06F 3/0481 |
| | | | 715/762 |
| 6,456,307 B1 | 9/2002 | Bates et al. | |
| 6,570,557 B1 | 5/2003 | Westerman et al. | |
| 6,633,315 B1 * | 10/2003 | Sobeski | G06F 9/451 |
| | | | 715/762 |
| 6,668,177 B2 | 12/2003 | Salmimaa et al. | |
| 6,677,932 B1 | 1/2004 | Westerman | |
| 6,690,387 B2 | 2/2004 | Zimmerman et al. | |
| 6,736,322 B2 | 5/2004 | Gobburu et al. | |
| 6,791,583 B2 | 9/2004 | Tang et al. | |
| 6,871,214 B2 | 3/2005 | Parsons et al. | |
| 6,895,552 B1 | 5/2005 | Balabanovic et al. | |
| 6,934,911 B2 | 8/2005 | Salmimaa et al. | |
| 6,992,687 B1 | 1/2006 | Baird et al. | |
| 7,015,894 B2 | 3/2006 | Morohoshi | |
| 7,184,064 B2 | 2/2007 | Zimmerman et al. | |
| 7,212,808 B2 | 5/2007 | Engstrom et al. | |
| 7,213,206 B2 | 5/2007 | Fogg | |
| 7,218,943 B2 | 5/2007 | Klassen et al. | |
| 7,283,839 B2 | 10/2007 | You et al. | |
| 7,310,534 B2 * | 12/2007 | Northcutt | H04M 1/72572 |
| | | | 342/357.31 |
| 7,346,850 B2 | 3/2008 | Swartz et al. | |
| 7,360,172 B2 | 4/2008 | Grossman et al. | |
| 7,433,920 B2 | 10/2008 | Blagsvedt et al. | |
| 7,540,415 B2 | 6/2009 | Frank et al. | |
| 7,552,094 B2 | 6/2009 | Park et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,685,530 B2 * | 3/2010 | Sherrard | H04M 15/8066 |
| | | | 715/764 |
| 7,827,059 B2 | 11/2010 | Arning | |
| 7,827,507 B2 * | 11/2010 | Geise | G01C 21/36 |
| | | | 715/850 |
| 7,844,914 B2 | 11/2010 | Andre et al. | |
| 7,913,192 B2 | 3/2011 | Dicke et al. | |
| 7,957,762 B2 | 6/2011 | Herz et al. | |
| 7,974,391 B2 | 7/2011 | Drewry et al. | |
| 8,006,002 B2 | 8/2011 | Kalayjian et al. | |
| 8,014,792 B2 * | 9/2011 | Sato | G06F 16/9537 |
| | | | 455/456.3 |
| 8,024,361 B2 | 9/2011 | Daughtry et al. | |
| 8,140,093 B2 * | 3/2012 | Zaffino | H04L 67/34 |
| | | | 455/456.3 |
| 8,190,692 B1 * | 5/2012 | Zilka | H04W 4/029 |
| | | | 709/206 |
| 8,205,249 B2 | 6/2012 | Meister et al. | |
| 8,233,885 B2 | 7/2012 | Kansal et al. | |
| 8,239,784 B2 | 8/2012 | Hotelling et al. | |
| 8,279,180 B2 | 10/2012 | Hotelling et al. | |
| 8,280,405 B2 * | 10/2012 | Sanz-Pastor | H04W 4/185 |
| | | | 455/456.2 |
| 8,320,528 B2 | 11/2012 | Diroo et al. | |
| 8,320,547 B2 | 11/2012 | Cho et al. | |
| 8,381,135 B2 | 2/2013 | Hotelling et al. | |
| 8,468,054 B1 | 6/2013 | Espinoza et al. | |
| 8,479,122 B2 | 7/2013 | Hotelling et al. | |
| 8,560,943 B2 | 10/2013 | Yu et al. | |
| 8,725,712 B2 * | 5/2014 | Arrasvuori | G06F 16/58 |
| | | | 707/706 |
| 8,825,081 B2 * | 9/2014 | Arrasvuori | H04W 4/02 |
| | | | 455/456.1 |
| 8,827,153 B1 | 9/2014 | Rhoades et al. | |
| 8,909,248 B2 * | 12/2014 | Phillips | G08B 21/0236 |
| | | | 455/456.1 |
| 9,329,052 B2 * | 5/2016 | Varanasi | G06F 16/29 |
| 9,348,458 B2 | 5/2016 | Hotelling et al. | |
| 9,575,556 B2 * | 2/2017 | Rekimoto | G06F 3/0481 |
| 9,582,937 B2 * | 2/2017 | Anttila | G06T 19/006 |
| 9,933,937 B2 | 4/2018 | Lemay et al. | |
| 10,032,100 B2 | 7/2018 | Mullen et al. | |
| 10,102,300 B2 | 10/2018 | Lemay et al. | |
| 10,223,631 B2 | 3/2019 | Mullen et al. | |
| 10,255,545 B2 | 4/2019 | Mullen et al. | |
| 10,354,004 B2 | 7/2019 | Karunamuni et al. | |
| 11,182,767 B1 | 11/2021 | Mateer et al. | |
| 2001/0017584 A1 | 8/2001 | Shinzaki | |
| 2002/0015024 A1 | 2/2002 | Westerman et al. | |
| 2002/0060246 A1 | 5/2002 | Gobburu et al. | |
| 2002/0115476 A1 | 8/2002 | Padawer et al. | |
| 2002/0165009 A1 | 11/2002 | Nohara et al. | |
| 2003/0023858 A1 | 1/2003 | Banerjee et al. | |
| 2003/0034185 A1 | 2/2003 | Kaikuranta | |
| 2003/0064756 A1 | 4/2003 | Nielsen et al. | |
| 2003/0215114 A1 | 11/2003 | Kyle | |
| 2004/0137884 A1 | 7/2004 | Engstrom et al. | |
| 2004/0172586 A1 | 9/2004 | Ragnet et al. | |
| 2004/0259536 A1 | 12/2004 | Keskar et al. | |
| 2005/0078177 A1 | 4/2005 | Gotanda | |
| 2005/0084450 A1 | 4/2005 | Hattori et al. | |
| 2005/0091272 A1 | 4/2005 | Smith et al. | |
| 2005/0160369 A1 | 7/2005 | Balabanovic et al. | |
| 2005/0165880 A1 | 7/2005 | Moody et al. | |
| 2005/0190059 A1 | 9/2005 | Wehrenberg | |
| 2005/0216526 A1 | 9/2005 | Kumagai | |
| 2005/0245281 A1 | 11/2005 | You et al. | |
| 2005/0247777 A1 | 11/2005 | Pitroda | |
| 2006/0017692 A1 | 1/2006 | Wehrenberg et al. | |
| 2006/0026521 A1 | 2/2006 | Hotelling et al. | |
| 2006/0033724 A1 | 2/2006 | Chaudhri et al. | |
| 2006/0084450 A1 | 4/2006 | Dam Nielsen | |
| 2006/0097991 A1 | 5/2006 | Hotelling et al. | |
| 2006/0101350 A1 | 5/2006 | Scott | |
| 2006/0151607 A1 | 7/2006 | Horikiri et al. | |
| 2006/0171515 A1 | 8/2006 | Hintermeister et al. | |
| 2006/0197753 A1 | 9/2006 | Hotelling | |
| 2006/0218112 A1 * | 9/2006 | Van De Sluis | G06F 3/04847 |
| 2006/0242691 A1 | 10/2006 | Meister | |
| 2006/0270419 A1 | 11/2006 | Crowley et al. | |

(56) References Cited

U.S. PATENT DOCUMENTS

| | | |
|---|---|---|
| 2006/0277460 A1 | 12/2006 | Forstall et al. |
| 2007/0009139 A1 | 1/2007 | Landschaft et al. |
| 2007/0016958 A1 | 1/2007 | Bodepudi et al. |
| 2007/0027763 A1* | 2/2007 | Yen ................ G06Q 30/02 705/14.5 |
| 2007/0035513 A1 | 2/2007 | Sherrard et al. |
| 2007/0047697 A1 | 3/2007 | Drewry et al. |
| 2007/0060206 A1 | 3/2007 | Dam Nielsen et al. |
| 2007/0128899 A1 | 6/2007 | Mayer |
| 2007/0129112 A1 | 6/2007 | Tarn |
| 2007/0156492 A1 | 7/2007 | Hawkins et al. |
| 2007/0162582 A1 | 7/2007 | Belali et al. |
| 2007/0162942 A1* | 7/2007 | Hamynen ........ H04N 21/42202 725/105 |
| 2007/0271367 A1 | 11/2007 | Yardeni et al. |
| 2007/0271527 A1 | 11/2007 | Paas et al. |
| 2007/0280457 A1 | 12/2007 | Aberethy et al. |
| 2007/0290831 A1 | 12/2007 | Kalinichenko et al. |
| 2007/0293275 A1 | 12/2007 | Kalinichenko et al. |
| 2008/0005679 A1* | 1/2008 | Rimas-Ribikauskas ................ G06F 1/1632 715/745 |
| 2008/0040960 A1 | 2/2008 | Keith |
| 2008/0055273 A1 | 3/2008 | Forstall |
| 2008/0059627 A1 | 3/2008 | Hamalainen et al. |
| 2008/0104067 A1 | 5/2008 | Thorson et al. |
| 2008/0125178 A1 | 5/2008 | Park et al. |
| 2008/0132243 A1 | 6/2008 | Spalink et al. |
| 2008/0132251 A1 | 6/2008 | Altman et al. |
| 2008/0133336 A1 | 6/2008 | Altman et al. |
| 2008/0133482 A1 | 6/2008 | Anick et al. |
| 2008/0153459 A1 | 6/2008 | Kansal et al. |
| 2008/0161045 A1 | 7/2008 | Vuorenmas |
| 2008/0162504 A1 | 7/2008 | Rentto et al. |
| 2008/0209516 A1 | 8/2008 | Nassiri |
| 2008/0220752 A1 | 9/2008 | Forstall et al. |
| 2008/0222531 A1 | 9/2008 | Davidson et al. |
| 2008/0270419 A1 | 10/2008 | Watanabe |
| 2008/0282196 A1 | 11/2008 | Park |
| 2008/0301555 A1 | 12/2008 | Vartiainen et al. |
| 2009/0061890 A1* | 3/2009 | Andreasson ............ H04L 67/34 455/456.1 |
| 2009/0098825 A1 | 4/2009 | Huomo et al. |
| 2009/0164923 A1 | 6/2009 | Ovi |
| 2009/0175509 A1 | 7/2009 | Gonion et al. |
| 2009/0178006 A1 | 7/2009 | Lemay et al. |
| 2009/0309742 A1 | 12/2009 | Alexander et al. |
| 2009/0327976 A1 | 12/2009 | Williamson et al. |
| 2010/0011304 A1 | 1/2010 | Van Os |
| 2010/0030696 A1 | 2/2010 | Naccache |
| 2010/0060586 A1 | 3/2010 | Pisula et al. |
| 2010/0078472 A1 | 4/2010 | Lin et al. |
| 2010/0082444 A1 | 4/2010 | Lin et al. |
| 2010/0146384 A1 | 6/2010 | Peev et al. |
| 2010/0159995 A1 | 6/2010 | Stallings et al. |
| 2010/0241663 A1 | 9/2010 | Huang et al. |
| 2010/0257490 A1 | 10/2010 | Lyon et al. |
| 2010/0306705 A1 | 12/2010 | Nilsson |
| 2011/0047074 A1 | 2/2011 | Cai |
| 2011/0053615 A1 | 3/2011 | Lee |
| 2011/0089233 A1 | 4/2011 | Locher |
| 2011/0107197 A1 | 5/2011 | Deluca et al. |
| 2011/0126119 A1 | 5/2011 | Young et al. |
| 2011/0145049 A1 | 6/2011 | Hertel et al. |
| 2011/0196741 A1 | 8/2011 | Gupta et al. |
| 2011/0202419 A1 | 8/2011 | Mamdani et al. |
| 2011/0231246 A1 | 9/2011 | Bhatia et al. |
| 2011/0246284 A1 | 10/2011 | Chaikin et al. |
| 2011/0252375 A1 | 10/2011 | Chaudhri |
| 2011/0294467 A1 | 12/2011 | Kim et al. |
| 2012/0009896 A1 | 1/2012 | Bandyopadhyay et al. |
| 2012/0029998 A1 | 2/2012 | Aversano et al. |
| 2012/0046050 A1 | 2/2012 | Hymel et al. |
| 2012/0060123 A1 | 3/2012 | Smith |
| 2012/0088523 A1 | 4/2012 | Shirakawa et al. |
| 2012/0095878 A1 | 4/2012 | Feldman et al. |
| 2012/0095979 A1 | 4/2012 | Aftab et al. |
| 2012/0097740 A1 | 4/2012 | Lamba et al. |
| 2012/0117467 A1 | 5/2012 | Maloney et al. |
| 2012/0117499 A1 | 5/2012 | Mori et al. |
| 2012/0158472 A1 | 6/2012 | Singh et al. |
| 2012/0159388 A1 | 6/2012 | Chalouhi et al. |
| 2012/0214442 A1 | 8/2012 | Crawford et al. |
| 2012/0231785 A1 | 9/2012 | Poon et al. |
| 2012/0278080 A1 | 11/2012 | Singh et al. |
| 2012/0284297 A1 | 11/2012 | Aguera-arcas et al. |
| 2012/0303431 A1 | 11/2012 | Phillips et al. |
| 2012/0323933 A1 | 12/2012 | He et al. |
| 2013/0145303 A1 | 6/2013 | Prakash et al. |
| 2013/0157637 A1 | 6/2013 | Bos |
| 2013/0198506 A1 | 8/2013 | Smith et al. |
| 2013/0200149 A1 | 8/2013 | Dorsey et al. |
| 2013/0282438 A1 | 10/2013 | Hunter et al. |
| 2013/0332826 A1 | 12/2013 | Karunamuni et al. |
| 2014/0047331 A1 | 2/2014 | Feldman et al. |
| 2014/0282084 A1 | 9/2014 | Murarka et al. |
| 2017/0352197 A1 | 12/2017 | Mitsunaga et al. |
| 2018/0121409 A1 | 5/2018 | Karunamuni et al. |
| 2019/0286694 A1 | 9/2019 | Karunamuni et al. |

FOREIGN PATENT DOCUMENTS

| | | |
|---|---|---|
| CN | 1708773 A | 12/2005 |
| CN | 1845165 A | 10/2006 |
| CN | 101809581 A | 8/2010 |
| CN | 101826219 A | 9/2010 |
| CN | 201765630 U | 3/2011 |
| EP | 1 327 929 A1 | 7/2003 |
| JP | 2000-148985 A | 5/2000 |
| JP | 2000-163031 A | 6/2000 |
| JP | 2002-318951 A | 10/2002 |
| JP | 2002-342033 A | 11/2002 |
| JP | 2003-281306 A | 10/2003 |
| JP | 2005-115099 A | 4/2005 |
| JP | 2006-195592 A | 7/2006 |
| JP | 2007-52574 A | 3/2007 |
| JP | 2009-135705 A | 6/2009 |
| JP | 2009-217712 A | 9/2009 |
| JP | 2010-224933 A | 10/2010 |
| JP | 2010-263578 A | 11/2010 |
| JP | 2010-536188 A | 11/2010 |
| JP | 2011-123755 A | 6/2011 |
| JP | 2012-511282 A | 5/2012 |
| KR | 2001-0090485 A | 10/2001 |
| KR | 10-2008-0085353 A | 9/2008 |
| TW | 201035860 A | 10/2010 |
| TW | 201145200 A | 12/2011 |
| TW | 201203156 A | 1/2012 |
| WO | WO-02/088996 A1 | 11/2002 |
| WO | 2013/169849 A2 | 11/2013 |
| WO | 2013/184840 A2 | 12/2013 |
| WO | 2014/105276 A1 | 7/2014 |

OTHER PUBLICATIONS

Anonymous. (2006). NetFrontBrowser v3.4, Access Co. Ltd. six pages.

Final Office Action dated Feb. 18, 2011, for U.S. Appl. No. 11/969,902, filed Jan. 6, 2008, 14 pages.

Final Office Action dated Nov. 1, 2011, for U.S. Appl. No. 12/170,295, filed Jul. 9, 2008, 15 pages.

Final Office Action dated Aug. 15, 2012, for U.S. Appl. No. 11/969,902, filed Jan. 6, 2008, eight pages.

Final Office Action dated Jan. 31, 2013, for U.S. Appl. No. 12/170,295, filed Jul. 9, 2008, 19 pages.

Final Office Action dated Dec. 20, 2013, for U.S. Appl. No. 12/170,295, filed Jul. 9, 2008, 18 pages.

Final Office Action dated Mar. 12, 2015, for U.S. Appl. No. 11/969,902, filed Jan. 6, 2008, 11 pages.

Final Office Action dated Mar. 19, 2015, for U.S. Appl. No. 12/170,295, filed Jul. 9, 2008, 25 pages.

(56) References Cited

OTHER PUBLICATIONS

IPhone Matters (Jan. 9, 2008). Located at http://www.iphonematters.com/article/my_iphone_wish_phone_contact_home_screen_icons_392/, last viewed on Nov. 17, 2008, 3 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Jun. 10, 2010, for U.S. Appl. No. 11/969,902, filed Jan. 6, 2008, 10 pages.
Non-Final Office Action dated Dec. 27, 2010, for U.S. Appl. No. 12/170,295, filed Jul. 9, 2008, 11 pages.
Non-Final Office Action dated Dec. 19, 2011, for U.S. Appl. No. 11/969,902, filed Jan. 6, 2008, 12 pages.
Non-Final Office Action dated Jun. 21, 2012, for U.S. Appl. No. 12/170,295, filed Jul. 9, 2008, 18 pages.
Non-Final Office Action dated Jun. 21, 2013, for U.S. Appl. No. 12/170,295, filed Jul. 9, 2008, 25 pages.
Non-Final Office Action dated Jun. 20, 2014, for U.S. Appl. No. 12/170,295, filed Jul. 9, 2008, 15 pages.
Non-Final Office Action dated Jul. 22, 2014, for U.S. Appl. No. 11/969,902, filed Jan. 6, 2008, 13 pages.
Notice of Allowance dated Jun. 1, 2018, for U.S. Appl. No. 12/170,295, filed Jul. 9, 2008, seven pages.
Notice of Allowance dated Jun. 15, 2018, for U.S. Appl. No. 11/969,902, filed Jan. 6, 2008, five pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Advisory Action received for U.S. Appl. No. 11/969,902, dated Nov. 28, 2012, 3 pages.
Advisory Action received for U.S. Appl. No. 11/969,902, dated Oct. 21, 2015, 3 pages.
Examiner's Answer to Appeal Brief received for U.S. Appl. No. 11/969,902, dated Aug. 11, 2016, 10 pages.
Examiner's Answer to Appeal Brief received for U.S. Appl. No. 12/170,295, dated Jul. 1, 2016, 17 pages.
Patent Board Decision received for U.S. Appl. No. 11/969,902, dated Mar. 28, 2018, 6 pages.
Patent Board Decision received for U.S. Appl. No. 12/170,295, dated Mar. 28, 2018, 7 pages.
Corrected Notice of Allowance received for U.S. Appl. No. 13/843,962, dated Jun. 10, 2019, 3 pages.
European Search Report received for European Patent Application No. 19192442.2, dated Dec. 4, 2019, 9 pages.
Extended European Search Report received for European Patent Application No. 13170575.8, dated Sep. 11, 2013, 6 pages.
Final Office Action received for U.S. Appl. No. 13/843,962, dated Apr. 9, 2018, 6 pages.
Final Office Action received for U.S. Appl. No. 13/843,962, dated Dec. 23, 2016, 15 pages.
Final Office Action received for U.S. Appl. No. 13/843,962, dated Nov. 6, 2015, 25 pages.
International Search Report received for PCT Patent Application No. PCT/US13/44372, dated Dec. 6, 2013, 3 pages.
Non Final Office Action received for U.S. Appl. No. 13/843,962, dated Jun. 16, 2016, 16 pages.
Non-Final Office Action received for U.S. Appl. No. 13/843,962, dated Apr. 23, 2015, 23 pages.
Non-Final Office Action received for U.S. Appl. No. 13/843,962, dated Aug. 9, 2018, 21 pages.
Non-Final Office Action received for U.S. Appl. No. 13/843,962, dated Aug. 22, 2017, 19 pages.
Non-Final Office Action received for U.S. Appl. No. 16/434,024, dated Jun. 26, 2020, 16 pages.
Notice of Allowance received for U.S. Appl. No. 13/843,962, dated Feb. 25, 2019, 9 pages.
Notice of Allowance received for U.S Appl. No. 15/852,577, dated Apr. 10, 2018, 16 pages.
Search Report received for Chinese Patent Application No. 201380028092.8, dated Jul. 5, 2016, 3 pages. (Official Copy only).
Search Report received for Taiwan Patent Application No. 102120383, dated Mar. 9, 2016, 4 pages (2 pages English translation and 2 pages official copy).
Search Report received for Taiwan Patent Application No. 102120383, dated May 14, 2015, 4 pages (2 pages English translation and 2 pages official copy).
Podio, F.L. , "Personal Authentication Through Biometric Technologies", Networked Appliances, Proceedings 2002 IEEE 4th International Workshop, ISBN 978-0-7803-7259-7, Jan. 15-16, 2001, pp. 57-66.
Non-Final Office Action received for U.S. Appl. No. 16/434,024, dated Feb. 18, 2021, 16 pages.
Final Office Action received for U.S. Appl. No. 16/434,024, dated Sep. 15, 2021, 22 pages.
Search Report received for Chinese Patent Application No. 201810631691.3, dated Jul. 7, 2021, 5 pages (2 pages of English Translation and 3 pages of Official Copy).
Final Office Action received for U.S. Appl. No. 16/434,024, dated May 11, 2022, 8 Pages.
Non-Final Office Action received for U.S. Appl. No. 16/434,024, dated Dec. 21, 2021, 7 pages.
Corrected Notice of Allowance received for U.S. Appl. No. 16/434,024, dated Dec. 7, 2022, 2 pages.
Corrected Notice of Allowance received for U.S. Appl. No. 16/434,024, dated Oct. 19, 2022, 2 pages.
Notice of Allowance received for U.S. Appl. No. 16/434,024, dated Sep. 26, 2022, 6 pages.
Search Report received for Chinese Patent Application No. 201810631691.3, dated Sep. 6, 2022, 8 pages (3 Pages of English Translation and 5 Pages of Official Copy).
Search Report received for Chinese Patent Application No. 201910447045.6, dated Sep. 2, 2022, 7 pages (3 pages of English Translation and 4 pages of Official Copy).
Li et al., "Illumination Invariant Face Recognition Using Near-Infrared Images", IEEE Transactions on Pattern Analysis and Machine Intelligence, vol. 29, No. 4, Apr. 2007, pp. 627-639.
Wang, Jian, "Security Control Requirements and Basic Methods of Electronic Commerce", Modern Electronic Technology, Issue 8, Aug. 25, 1999, 3 pages. See attached Communication 37 CFR § 1.98(a) (3).

* cited by examiner

ADDING A CONTACT TO A HOME SCREEN

CROSS-REFERENCE TO RELATED APPLICATIONS

This application is a continuation of U.S. patent application Ser. No. 12/170,295, filed Jul. 9, 2008 and published on Jan. 14, 2010 as U.S. Patent Publication No. 2010-0011304, the contents of which are incorporated herein by reference in their entirety for all purposes.

TECHNICAL FIELD

This subject matter is generally related to user interfaces for mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, a browser to surf the Internet, etc. Modern mobile devices can include two or more of these applications. The applications can be represented on a user interface of the mobile device by icons.

Mobile devices often include databases (e.g., an address book) of contacts associated with the user. Entries in an address book can include digital objects (e.g., photos), and other information (e.g., text), corresponding to a particular contact. While having all contact information in one place can be convenient, quickly finding an often needed contact can sometimes be difficult and inconvenient.

SUMMARY

An icon can be created for a contact (e.g., an individual(s) or an entity) and presented on a user interface of a mobile device, such as a "home screen." The icon can be used to retrieve and display contact information. The icon can also be used to invoke one or more applications that are personalized to the contact. The icon can be modified to display information related to the contact. In one aspect, an icon associated with an entity can be temporarily displayed on the mobile device based on the proximity of the mobile device to the entity. The icon can be used to retrieve and display information related to the entity. Additionally, the icon can be removed from the display on the mobile device when the mobile device is no longer within a certain proximity of the entity.

Other implementations are disclosed which are directed to systems, methods and computer-readable mediums.

Particular embodiments of the subject matter described in this specification can be implemented to realize one or more of the following advantages. Users can create icons for a mobile device, where the icons can represent often accessed user contacts. User created icons can allow convenient access to all information and applications related to a contact. Thus, consecutive access to applications related to a contact can be greatly diminished. Additionally, temporary user access to applications relative to a location allows a user to minimize the amount of application data stored on a user mobile device.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Mobile Device Overview

Figure 1:
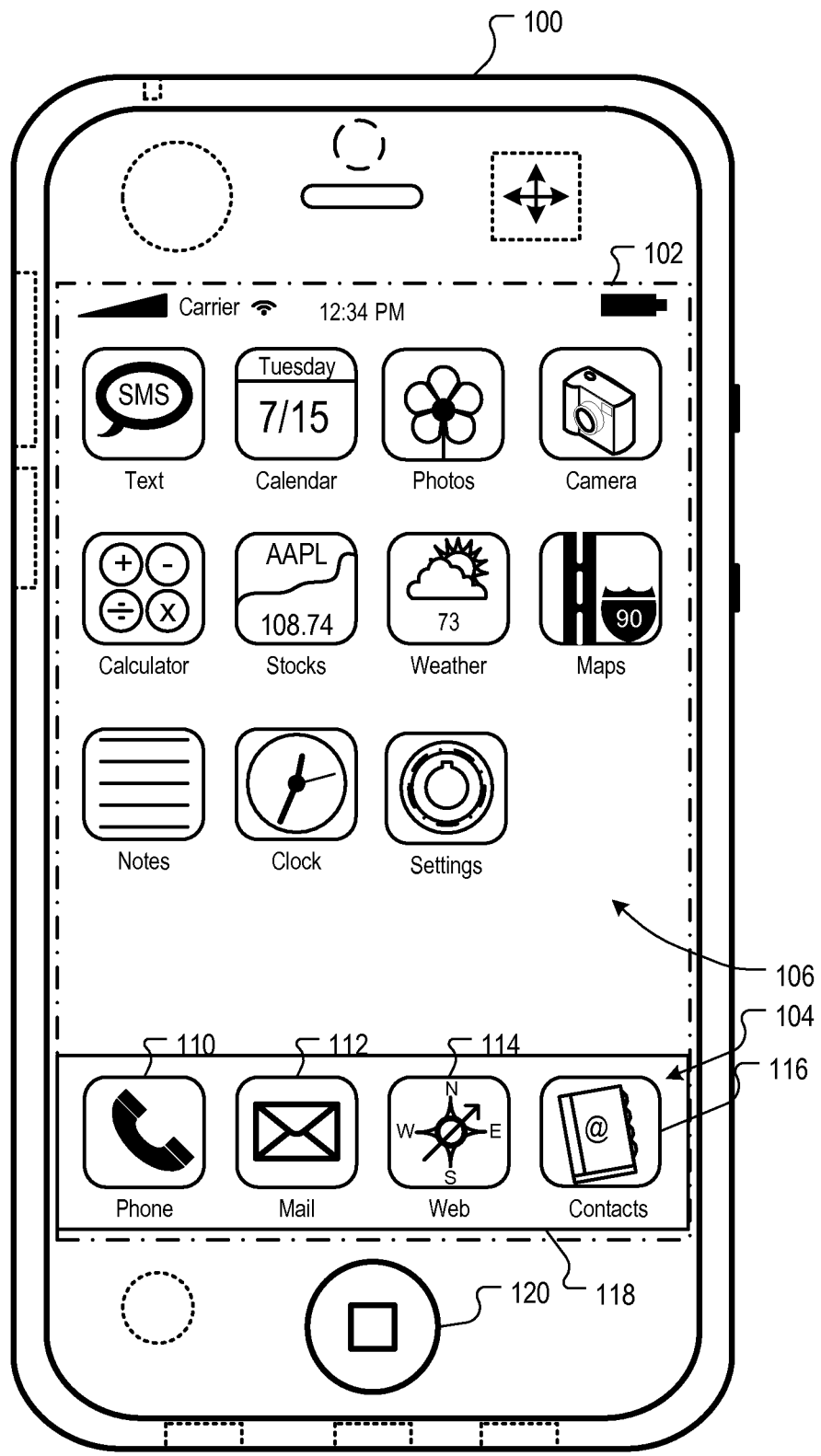
FIG. 1 is a block diagram of an example mobile device.

FIG. 1 is a block diagram of an example mobile device 100. For example, the mobile device 100 can be a cellular phone, a personal digital assistant (PDA), or a portable media device (e.g., a portable MPEG-1 Audio Layer 3 (MP3) player, a portable DVD player, etc.). Some examples of the mobile device 100 may be an iPhone™ or an iPod touch™ of Apple Inc. in Cupertino, Calif.

In some implementations, the mobile device 100 includes a touch-sensitive display or device 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display. A multi-touch-sensitive display can, for example, process multiple simultaneous touch points, including processing data related to the pressure degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570, 557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can include multiple device functionalities, such as a telephony device, as indicated by a phone object 110; an e-mail device, as indicated by the e-mail object 112; a network data communication device, as indicated by the Web object 114; and an address book object, as indicated by the contacts object 116. In some implementations, particular display objects 104 (e.g., the phone object 110, the e-mail object 112, the Web object 114, and the contacts object 116), can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, upon invocation of a device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the contacts object 116 may cause the graphical user interface to present display objects related to various address book functions.

In some implementations, a top-level graphical user interface environment or "home screen" of FIG. 1 can be restored by pressing a button 120 located near the bottom of the mobile device 100. In some implementations, each device functionality may have a corresponding "home" display object displayed on the touch-sensitive display 102. In these implementations, pressing the "home" display object can restore the graphical user interface environment of FIG. 1.

As noted above, various software applications can be executed by the mobile device 100. For example, a user can use an address book application to access one or more contacts in the address book. A contact can be an individual, a group of individuals (e.g., a club), or an entity (e.g., a business or a location for a business).

Example Contact and Related Options

Figure 2:
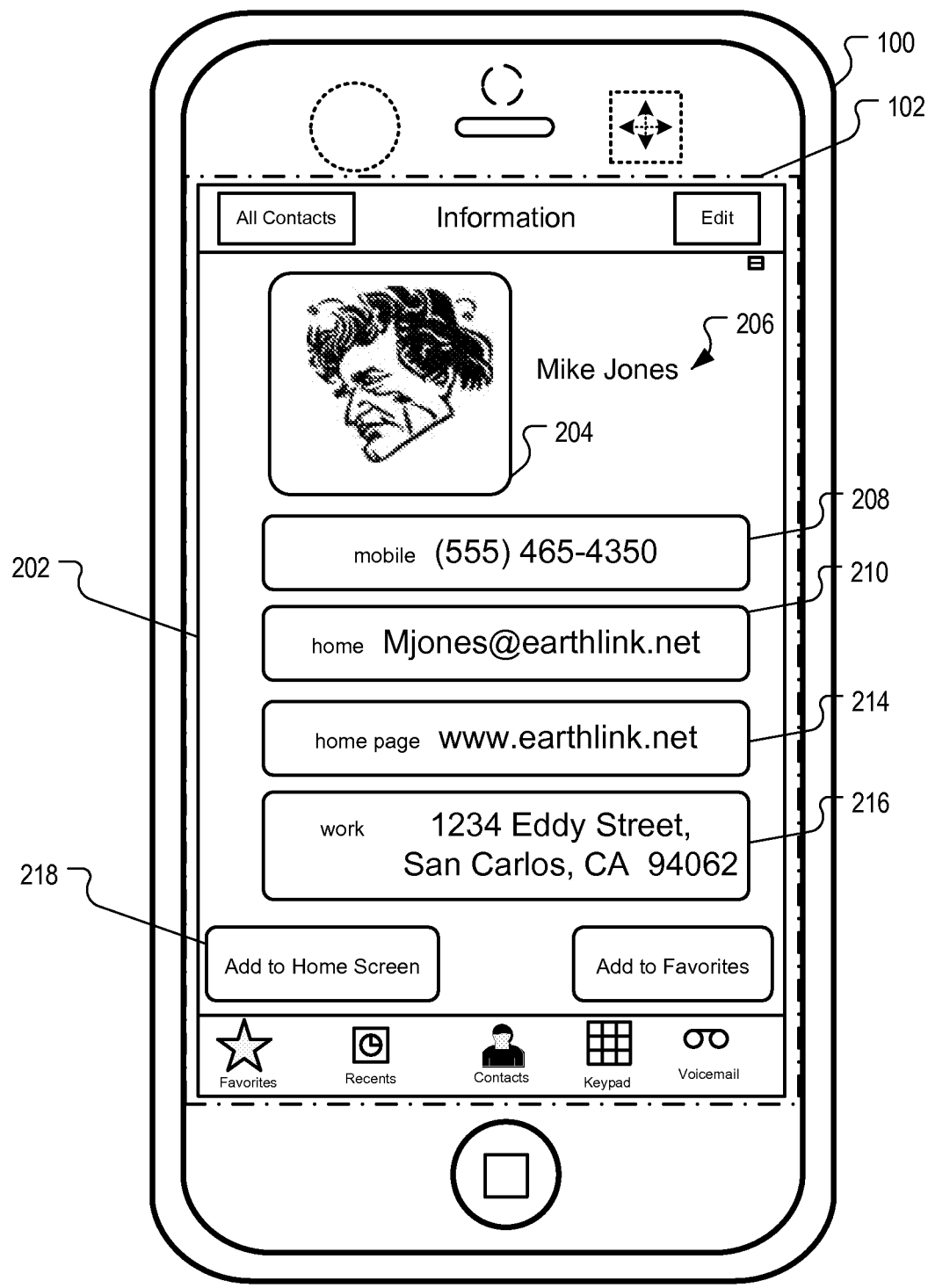
FIG. 2 is a block diagram of an example of a mobile device capable of creating an icon for a contact.

FIG. 2 is a block diagram of an example of a mobile device 100 capable of creating an icon for a contact. In some implementations, an icon can be a sign or likeness that stands for, signifies, or represents objects such as a person, place or thing. An icon can be an image (e.g., a thumbnail photo), or representation readily recognized as having some well-known significance or embodying certain qualities with respect to the object the icon represents. An icon can include text. An icon can be an active link (e.g., to a related contact).

As shown, a contact page 202 is displayed for the user on the touch sensitive display 102 of the mobile device 100. The contact page 202 can include content. For example, the contact page 202 can include an image 204 of a person, place, or thing representing the contact. The contact page 202 can display a name 206 of the contact. The contact page 202 can include other information associated with the contact, such as any combination of one or more phone numbers 208, one or more email addresses 210, one or more website (e.g., Internet homepage) addresses 214, or one or more concrete (e.g., mailing) addresses 216. The name 206 and other information associated with the contact can be edited by the user using a virtual keyboard, as will be described in reference to FIG. 3.

In one implementation, the user can interact with the contact 202. For example, the user can create an icon associated with the contact 202 and have the icon accessible on a user interface associated with the mobile device 100, such as a home screen. The icon can, for example, include an image and text that functions as a link to the contact page 202. When the icon is touched or otherwise interacted with by the user, the contact page 202 is displayed on the touch sensitive display 102. In some implementations, the contact page 202 is stored in an address book application on the mobile device 100.

In one implementation, the contact page 202 can present one or more options to the user. For example, selecting an "Add to Home Screen" button 218 in the contact page 202 can result in the creation of an icon for the contact. The icon created for the contact can then be displayed on a user interface, such as the home screen. The user can tap or gesture on the touch sensitive display 102 to select the option "Add to Home Screen" 218.

In one implementation, upon receiving input selecting the "Add to the Horne Screen" button 218, a portion of content associated with the contact page 202 can be converted into an icon. For example, as a default, the image 202 (e.g., a photo of the contact) can be copied, reduced in size, and converted into an icon, as described in reference to FIG. 3. If a photo is not available, a default graphic can be displayed or the user can be presented with a number of contact icons for selection by the user. In some implementations, other content can be converted into the icon. In some implementations, icons can be edited by the user (e.g., to change the name of the icon).

Example Interface For Naming Icons

Figure 3:
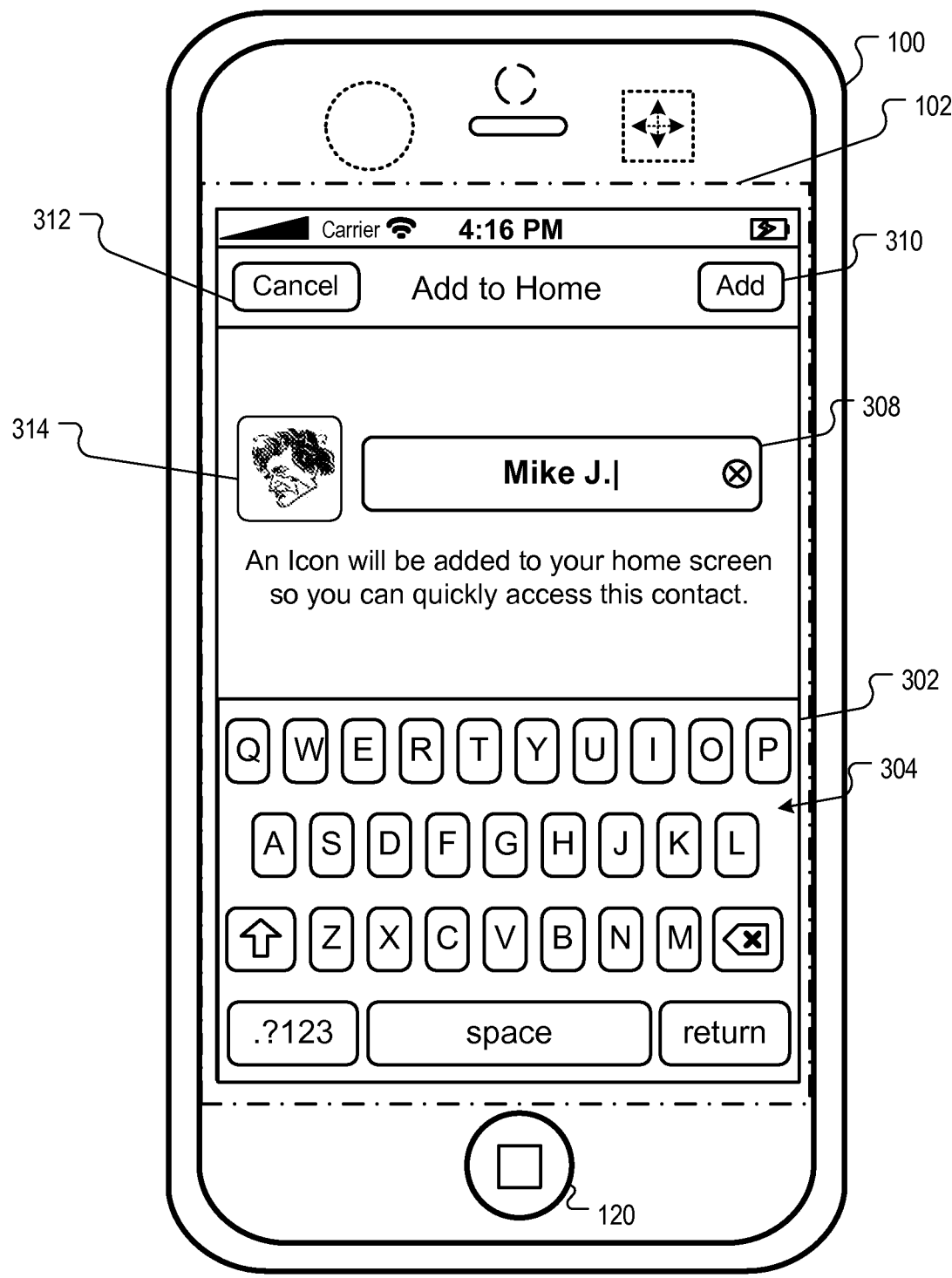
FIG. 3 is a block diagram of an example mobile device depicting a virtual keyboard used in creating an icon.

FIG. 3 is a block diagram of an example mobile device 100 depicting a virtual keyboard 302 used in creating an icon associated with the contact 202. The virtual keyboard 302 includes buttons or keys 304. In one example, the user can select a character by tapping a key on the virtual keyboard 302 that corresponds to the character. The user can also select a cancel button 312 if the user decides not to create an icon.

In one implementation, the user can be presented with a preview of the icon 314 that will be displayed on a user interface (e.g., home screen) of the mobile device 100. In this example, the image 204 was selected from the contact page 202 and rendered into the preview icon 314. Suitable processes for rendering icons from content are available through application programming interfaces (APIs) of known image processing tools, such as Icon Composer distributed as part of Apple Inc.'s Mac OS® X operating system.

In some implementations, an icon can have a default name. In other implementations, a user can create a name to be associated with a newly created or existing icon. In some implementations, a name created by the user can be presented along with the preview icon 314. In these implementations, the user can use the virtual keyboard 302 to input text for a name of the icon to add to a user interface of the mobile device 100. As shown, the mobile device 100 includes a text input box 308 for composing text. For example, the user can input text for an icon name by selecting characters from the virtual keyboard 302. After inputting the name, the user can select an add button 310 to add the icon to a user interface (e.g., home screen) of the mobile device 100.

A user touching an icon on the home screen can cause various actions on the mobile device 100. The icon can act as a "shortcut" to the contact in an address book application on the mobile device 100. The user can use the icon to navigate directly to the address book application residing on the mobile device 100. A contact screen presented by the address book application can show status on SMS messages, phone calls, emails, etc., received from the contact. In some implementations, touching the contacts icon will open a user interface that bundles appropriate services or applications related to the contact. In this case, a dedicated menu bar can be shown with a dedicated button for each service or application. Each button can include a badge to indicate status associated with the service or application, including the number of unread SMS messages for an SMS button, a number of unread emails for a mail button, etc.

Example Contact Functionalities

Figure 4:
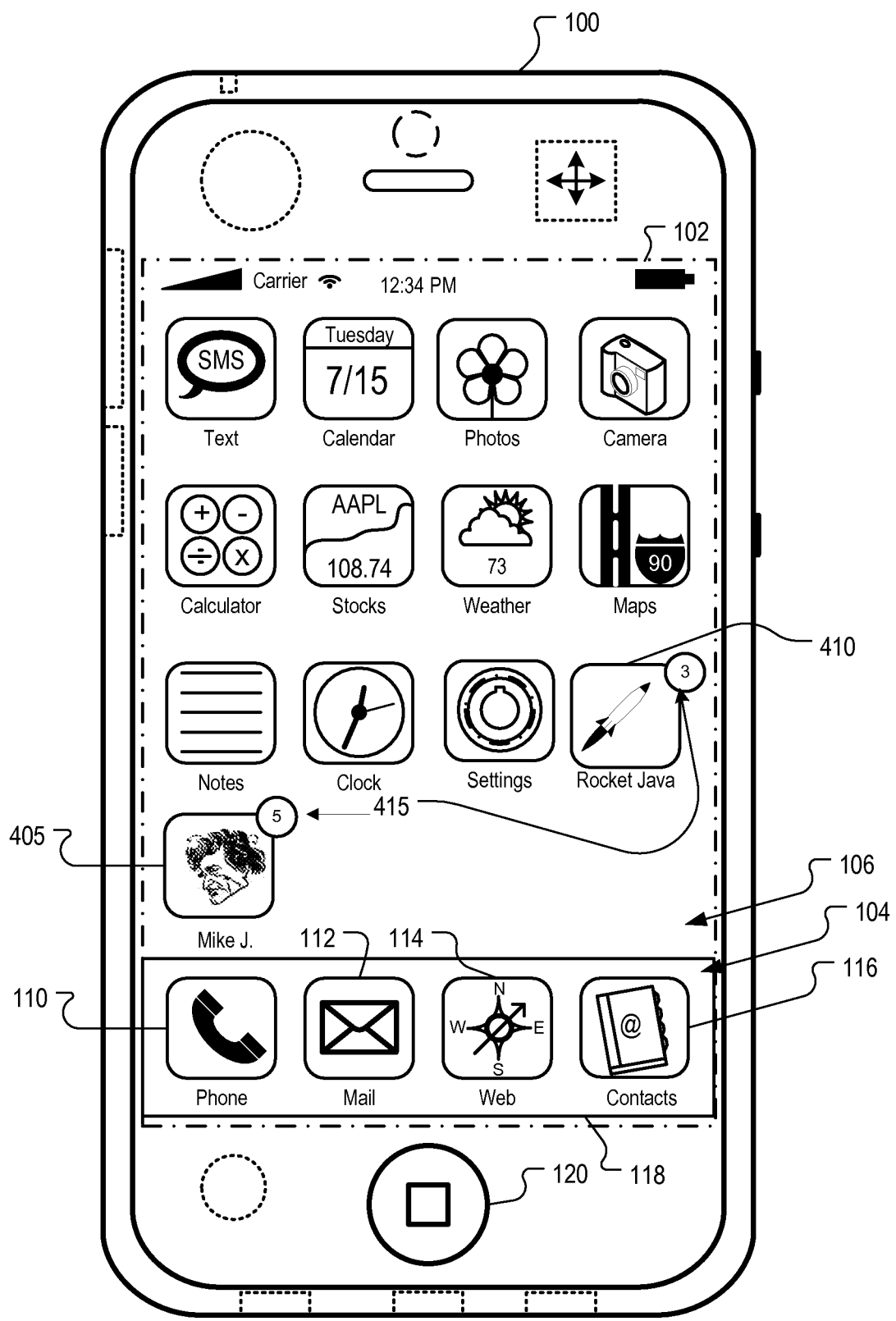
FIG. 4 is a block diagram of an example mobile device including newly created icons.

FIG. 4 is a block diagram of an example mobile device 100 including newly created icons 405 and 410. Newly created icon 405 is an icon associated with the contact page 202 depicted in FIG. 2. The icon 405 includes the name input "Mike J." created using the virtual keyboard 302 depicted in FIG. 3. Newly created icon 410 will be discussed in detail below.

In some implementations, the newly created icon 405 can be a "shortcut" to a single application (e.g., a phone application). In some implementations, the icon 405 can be a shortcut to one or more additional applications that can be associated or personalized to a contact. For example, a user can communicate or interact with a contact in a variety of ways using different applications including, but not limited to, a short messaging service (SMS) application, a phone application, an email application, a calendar application, or an application capable of determining location information (e.g., GPS). Interacting with such applications can provide information or services to the user that are associated with a specific contact (e.g., an individual or entity). For example, by interacting with an SMS application, a user can determine the number of "short text messages" the user has received from a particular contact. In another example, by interacting with a phone application, a user can determine the number of voicemails the user has received from a particular contact.

In some implementations where one or more applications can be associated with a contact, a newly created icon 405 can include a content specific graphic indication 415 (e.g., a "badge") for conveying status. For example, a number of missed calls, voicemails, emails or SMS messages, etc., can be enumerated with status badges which can be attached to corresponding icons on the Home Screen. In some implementations, a newly created icon 405 can include a separate graphic indication 415 for each associated application. For example, an envelope graphic can be used to represent unread email messages, or a telephone graphic can be used to represent unheard voicemail messages.

In some implementations, a badge or a graphic indication 415 can be animated. Examples of animations include but are not limited to pulses, color changes, swirling, swirling colors, pulsing swirling colors, starbursts, or other graphical indicators. In some implementations, the animations can be updated or replaced to reflect a change in status with respect to the corresponding application. In other implementations, the graphic indication 415 is removed once the content has been consumed or reviewed. For example, a pulsing envelope graphic can indicate unread email. Once the user has viewed the unread email, the pulsing envelope graphic can be replaced with a non-pulsing envelope graphic. In some implementations, the graphic indication 415 can be accompanied by an audio file or sound effect for informing the user. For example, an audio file accompanying an envelope graphic can inform the user that they have unread emails. In some implementations, animated and audible elements can be enabled or disabled by a user or application as needed. In some implementations, the icon 405 can be or include a link to a contact page or application specific to the contact.

Figure 5A:
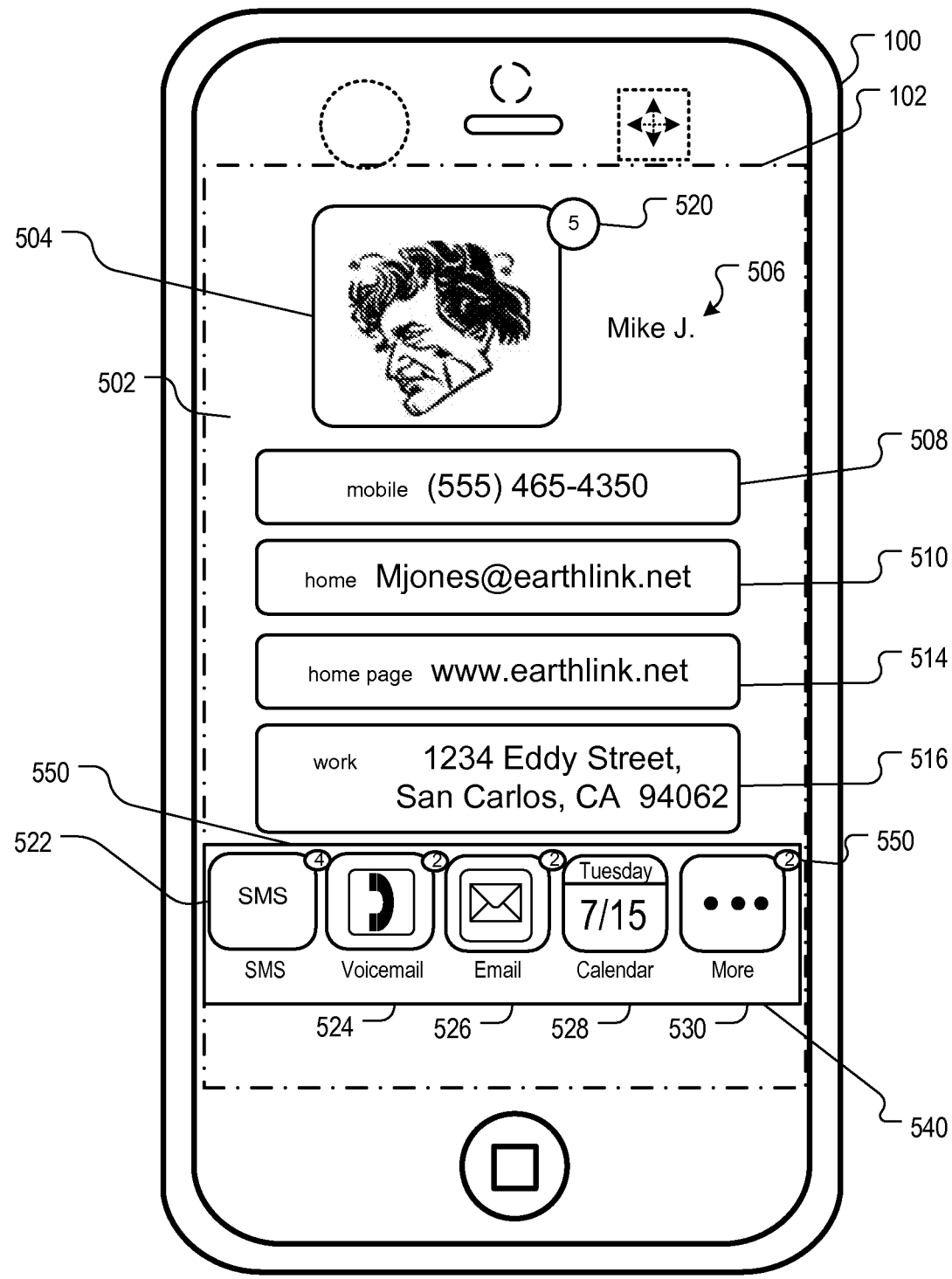
FIG. 5A is a block diagram of an example mobile device including a page associated with a newly created icon in FIG. 4.

FIG. 5A is a block diagram of an example mobile device 100 including a page 502 associated with a newly created icon 405 depicted in FIG. 4. In some implementations, selecting the icon 405 can cause the contact page 502 to be displayed on the mobile device 100. The contact page 502 can include an image 504 of a person, place, or thing representing the contact. The contact page 502 can include a name 506 of the contact. The contact page 502 can include other information associated with the contact, such as any combination of one or more phone numbers 508, one or more email addresses 510, one or more website (e.g., Internet homepage) addresses 514, or one or more concrete (e.g., mailing) addresses 516. The name and other information associated with the contact page 502 can be edited by the user, as described with respect to FIG. 3.

In some implementations, an icon representing each application associated with the contact can be displayed on the contact page 502. For example, contact page 502 includes a menu bar 540. Included in the menu bar 540 is an SMS icon 522, a voicemail icon 524, an email icon 526, and a calendar icon 528. Additionally, the menu bar 540 includes a "more" icon 530 which will be described in detail below. In some implementations, the menu bar 540 can facilitate switching between applications as needed. Each of the icons can have a status "badge" for indicating content that has not yet been consumed or viewed (e.g., a number of unread email or SMS messages).

Figure 5B:
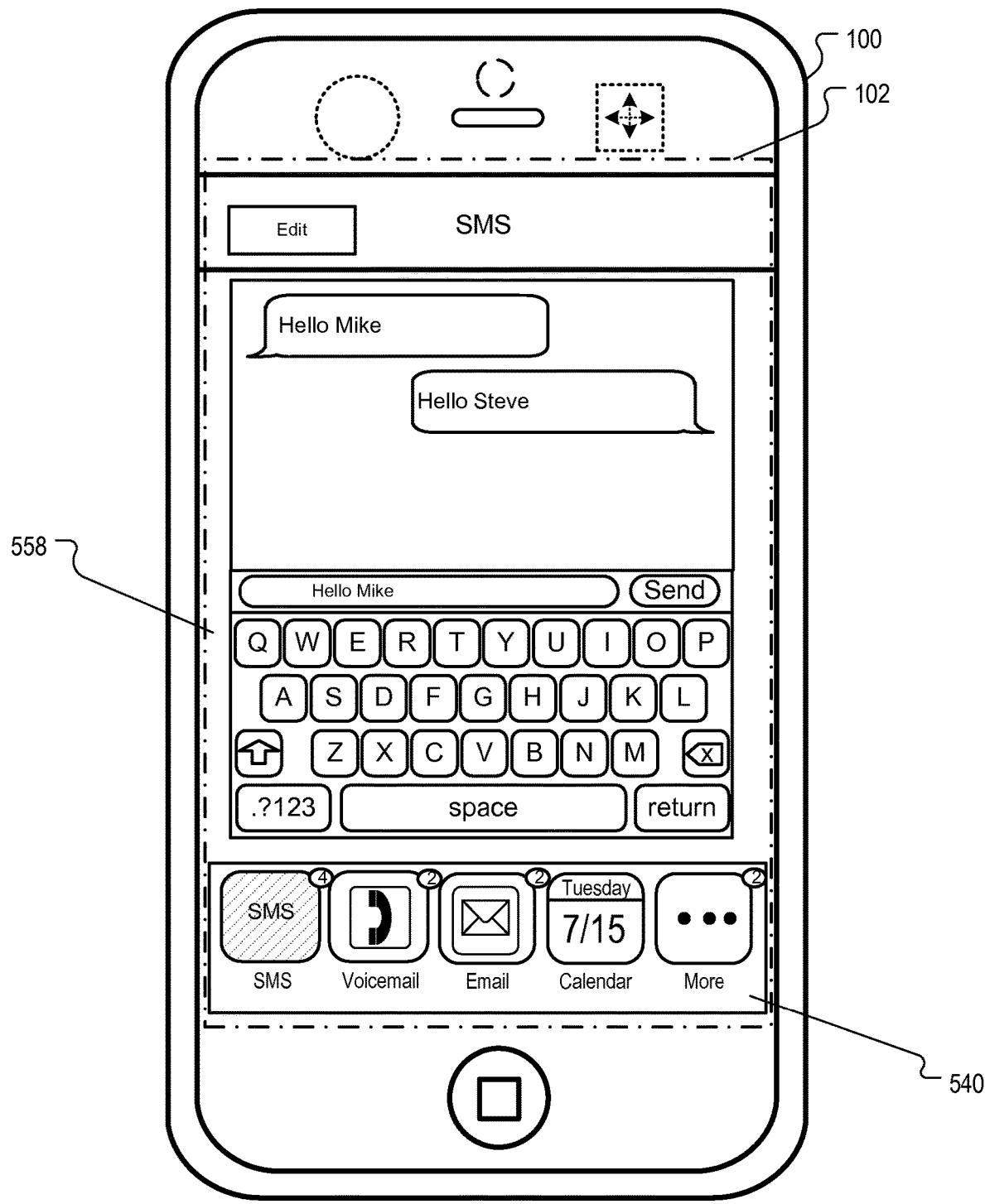
FIG. 5B is a block diagram of an example mobile device including a page associated with the "SMS" icon in FIG. 5A.

In some implementations, an icon representing an application can include an additional graphic indication 550. For example, the SMS icon 522 includes a badge 550 that displays the number 4. This number can indicate that four new or unread "short text messages" are associated with the contact "Mike J." Likewise, voicemail icon 524 includes a badge 550 that displays the number 2. This number can indicate that two new or unheard "voicemails" are associated with the contact "Mike J." Some applications will not have current data available for the user and thus no graphic indication will be displayed (e.g., calendar icon 528). Alternatively, a graphic indication with a zero can be used when no current data is available. In some implementations, selection of an application icon in the menu bar 540 can facilitate access to functions associated with the corresponding application. For example, selection of the SMS icon 522 can facilitate access to and interaction with an in-box of an SMS application, allowing a user to read "short text messages." In some implementations, selection of an icon representing an application can cause a graphical user interface for the application to present a page on the touch sensitive display 102 on the mobile device 100. FIG. 5B is a block diagram of an example mobile device including a page 558 associated with the "SMS" icon in FIG. 5A. User interfaces for other services or applications listed in the menu bar 540 can be similarly displayed in response to selection of the corresponding button.

Figure 5C:
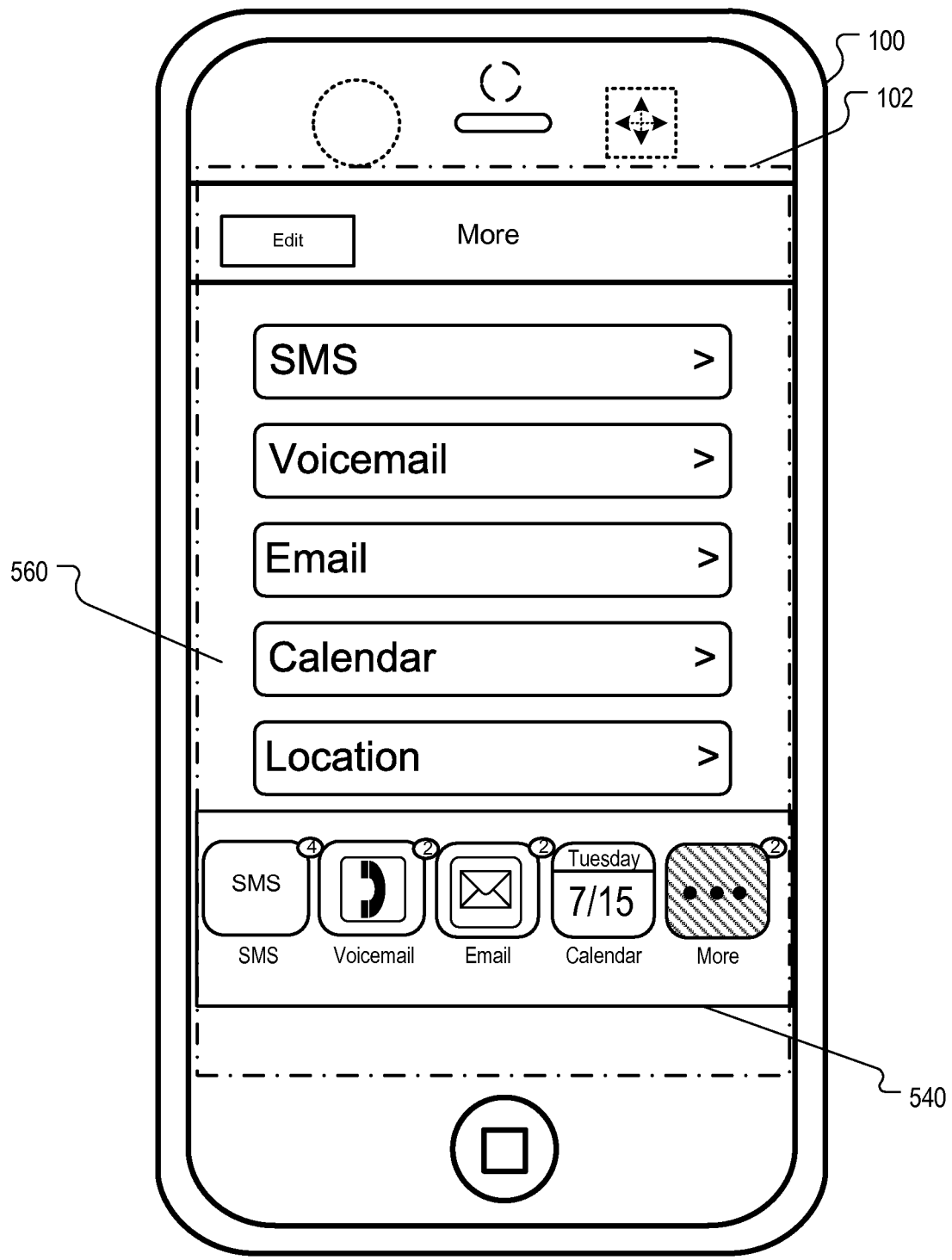
FIG. 5C is a block diagram of an example mobile device including a page associated with the "more" icon in FIG. 5A.

FIG. 5C is a block diagram of an example mobile device 100 including a page associated with the "more" icon 530 in FIG. 5A. In some implementations, selection of the "more" icon 530 can result in a "more" page 560 being presented on a user interface of the mobile device 100. In some implementations, the "more" page 560 can include a list of one or more options for editing settings of the various applications displayed in menu bar 540. In some implementations, the menu bar 540 configuration can be customized (e.g., automatically or by user-indicated preferences). For example, in implementations where the "more" page 560 does not require an additional "more" button 530, the "more" button 530 can be replaced with one or more additional buttons (e.g., a location button) as space permits.

Example Temporary Object

Figure 6A:
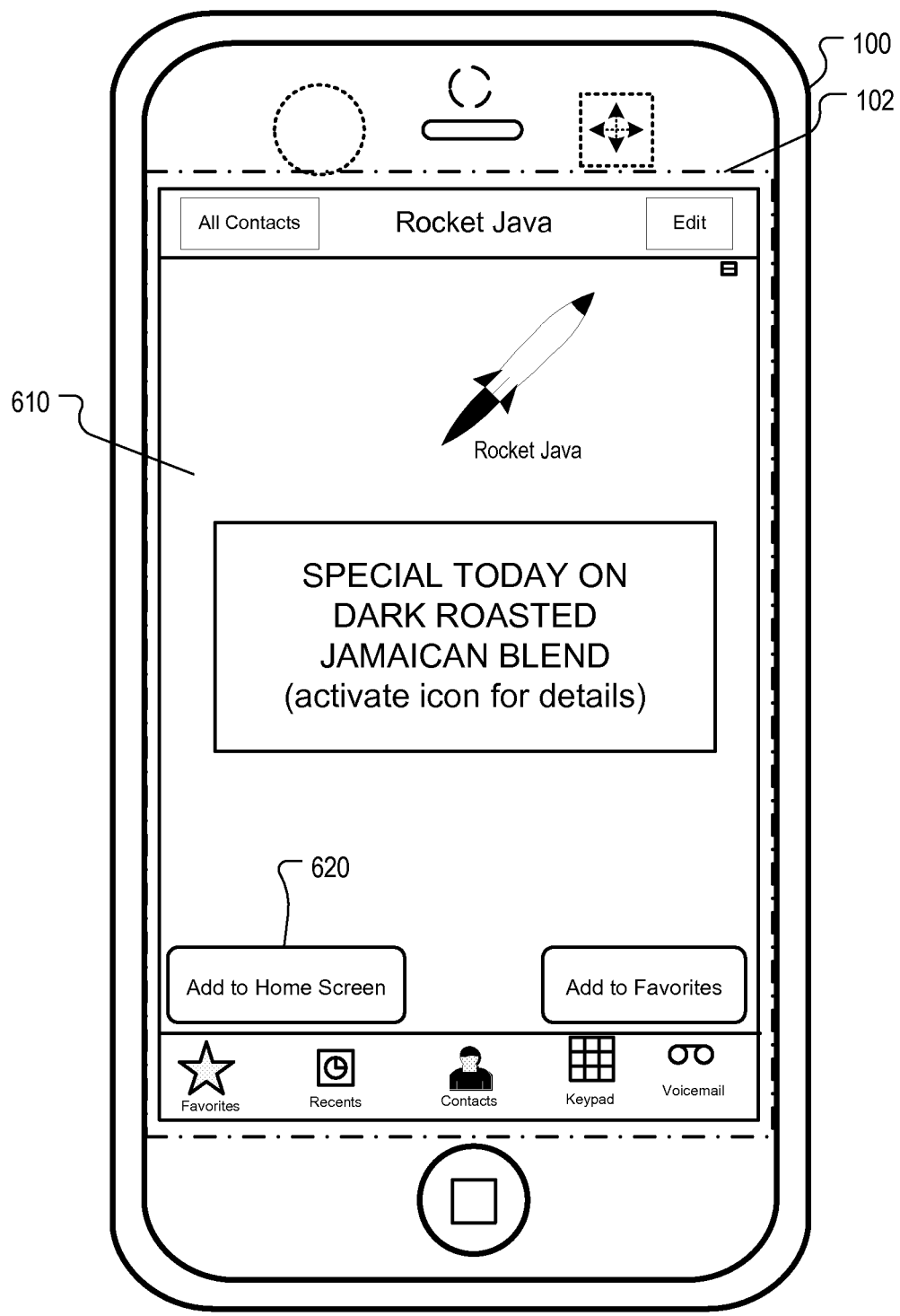
FIG. 6A is a block diagram of an example mobile device including a process for creating an icon.

In some implementations, the mobile device 100 can indicate to other devices and systems an ability to temporarily receive an icon associated with an object by advertising through a Bluetooth or Wi-Fi connection that the mobile device is "contact capable." A preference can be set in a preference pane or menu displayed on the mobile device 100 to engage a "contact capable" mode. Alternatively, a "contact capable" mode can be triggered by the location of the device using positioning technology (e.g., Wi-Fi, GPS). FIG. 6A is a block diagram of an example mobile device 100 including a process for creating a temporary or permanent icon. In some implementations, a contact 610 can temporarily appear on a mobile device 100 when the mobile device 100 is within a determined proximity of a contact host. The contact host can be a server or device operated by an individual, entity or service capable of providing the icon and related application information. In the present example, the contact host is a server operated by a coffee house called "Rocket Java". An alert can be presented on the mobile device 100 to indicate that a temporary contact or application is available to the mobile device 100. In one example, the alert can have two options: "dismiss" and "view contact." After the contact has been viewed, other options can be presented, including options like "add to local contacts" or "save to the home screen." The selection of these options by the user results in the contact being added to an address book application or the home screen, respectively. In other implementations, the contact is automatically added to the home screen when available. In some implementations, a user can a preference for automatically adding a contact to a home screen without alerting the user or otherwise requiring user interaction. Another option can be to have a dedicated area for temporary contact icons on the home screen and/or in an address book application.

In one implementation, the contact 610 can present one or more options to the user (e.g., an "Add to Home Screen" button 620). The user can tap the touch sensitive display 102 to select the "Add to Home Screen" button 620. In this implementation, selecting the "Add to Home Screen" button 620 in the contact 610 can result in the creation of an icon associated with the contact 610. Additionally, selecting the "Add to Home Screen" button 620 can cause the icon to be added to a user interface of the mobile device 100 (e.g., a home screen).

In some implementations, an icon (e.g., the "Rocket Java" icon 410 depicted in FIG. 4) can temporarily appear on a mobile device 100. The icon can represent an object (e.g., an individual, entity, or service) that is within a certain proximity of the mobile device 100. In some implementations, the icon 410 can include a graphic indication (e.g., a "badge" 415), signifying a status, as previously described. For example, the badge can indicate new messages from Rocket Java, or new offers (e.g., "For you, today, a free croissant with your latte . . . ").

In some implementations, a contact screen representing Rocket Java can be presented on the mobile device 100 without any unique or special features. In other implementations, a Rocket Java application with unique or special features can be presented on the mobile device 100. The Rocket Java application can have unique or special features not shared by other applications (e.g., features associated with coffee consumption). The Rocket Java application can be downloaded automatically to the mobile device 100, or users can be directed to an online store to initiate a download of the Rocket Java application.

Figure 6B:
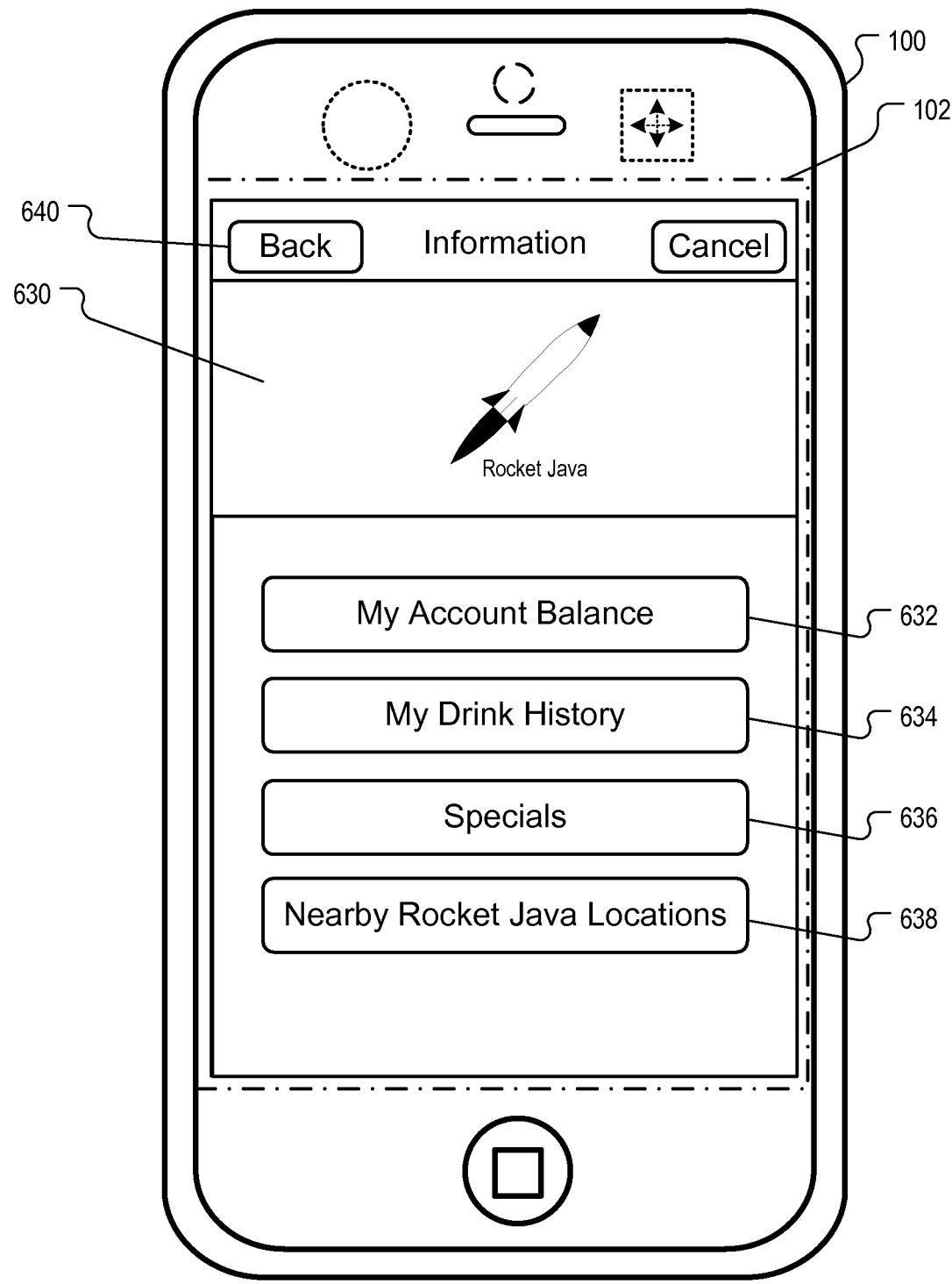
FIG. 6B is a block diagram of an example mobile device including a page associated with a newly created icon in FIG. 4.

FIG. 6B is a block diagram of an example mobile device 100 including a page 630 associated with the newly created icon 410 shown in FIG. 4. In some implementations, selection of the icon 410 representing an application can cause a page specific to that application to be displayed on the mobile device 100. In some implementations, selection of the icon 410 can invoke a corresponding object environment and functionality.

For example, page 630 can include options for checking an account balance (e.g., by selecting the "My Account Balance" button 632), viewing a purchased drink history (e.g., by selecting the "My Drink History" button 634), viewing specials (e.g., by selecting the "Specials" button 636), and viewing nearby locations (e.g., by selecting the "Nearby Rocket Java Locations" button 638). In this example, the "My Account Balance" option and the "My Drink History" option can be user specific, while the "Specials" option and the "Nearby Rocket Java Locations" option can be contact specific. In some implementation, the page 630 can also include a "back" button 640 for returning to the previous page.

In some implementations, the icon 410 and the related application information are visible and available only when the mobile device 100 is within a certain proximity of the individual, entity or service hosting the icon and related application. For example, when mobile device 100 is outside a determined proximity, the icon 410 can be removed from mobile device 100 and the related application information can become unavailable. In some implementations, a return to a location within a determined proximity can reinstate the temporary icon 410 and the related application information. In some implementations, while mobile device 100 is within a determined proximity, mobile device 100 can statically store and update information specific to a user and with respect to a particular contact host. In some implementations, a user can pass an icon and associated contact page from their device to another user's device using a wireless communication link (e.g., Wi-Fi). For example, several users in a meeting can exchange contacts and personal icons.

Example Icon Creation Process

Figure 7:
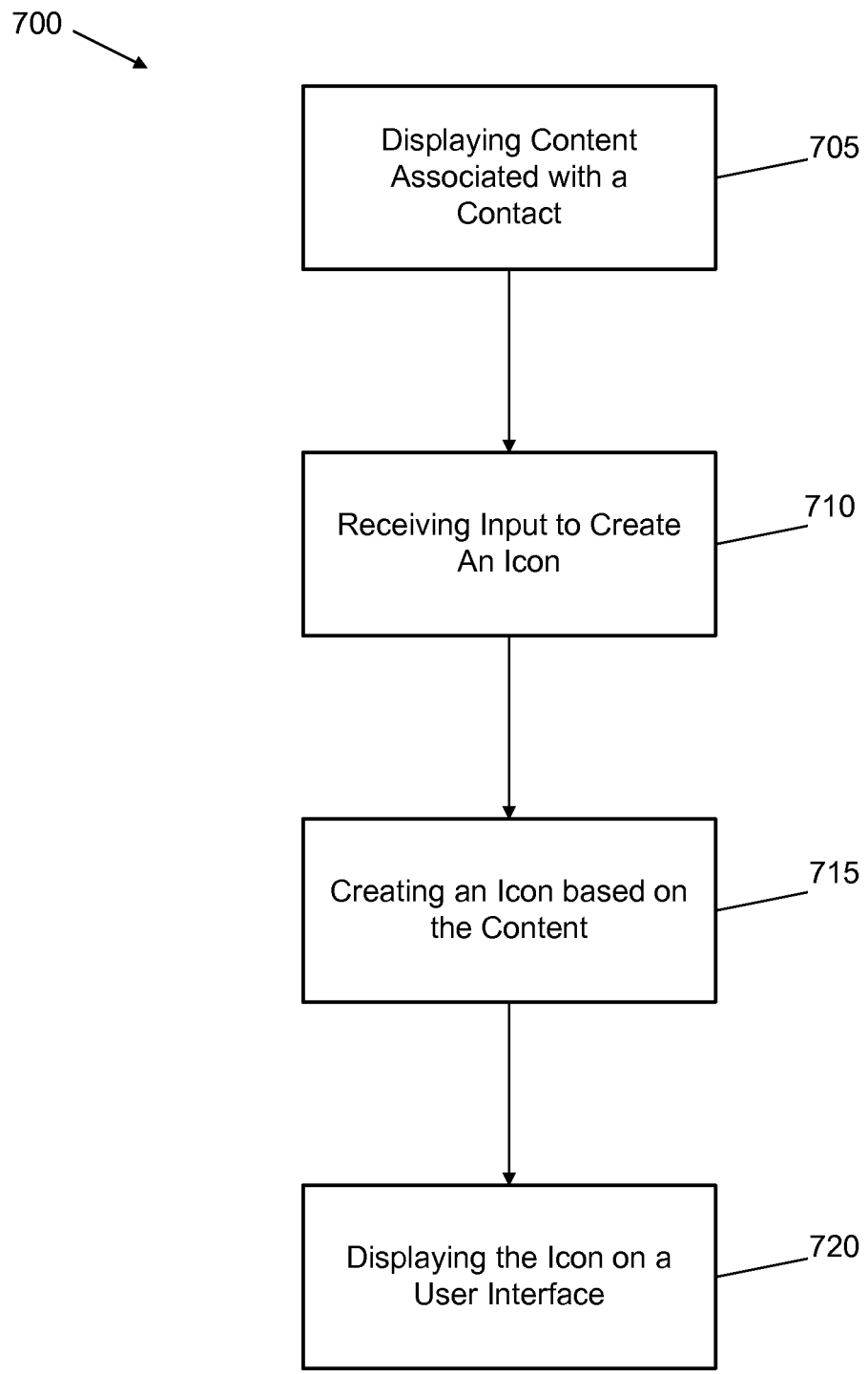
FIG. 7 is a flow diagram of a process for creating icons for content.

FIG. 7 is a flow diagram of a process 700 for creating icons for content. The process 700 begins when content associated with a contact is displayed on the mobile device (705). The content can be included in a contact stored in an address book, for example.

An input to create an icon associated with the contact is received through a user interface (710). The input can be the user selecting a user interface element (e.g., a button) that is presented proximate to the contact content. The input can cause an option pane to be presented to the user for allowing the user to select an option to create an icon associated with the contact. An icon can be created based on the content (715). In one implementation, the content can be captured as an image (e.g., a bitmap) and scaled to fit the dimensions of the icon. The icon can be displayed on a user interface of the mobile device (720), such as a home screen.

Example Application Association Process

Figure 8:
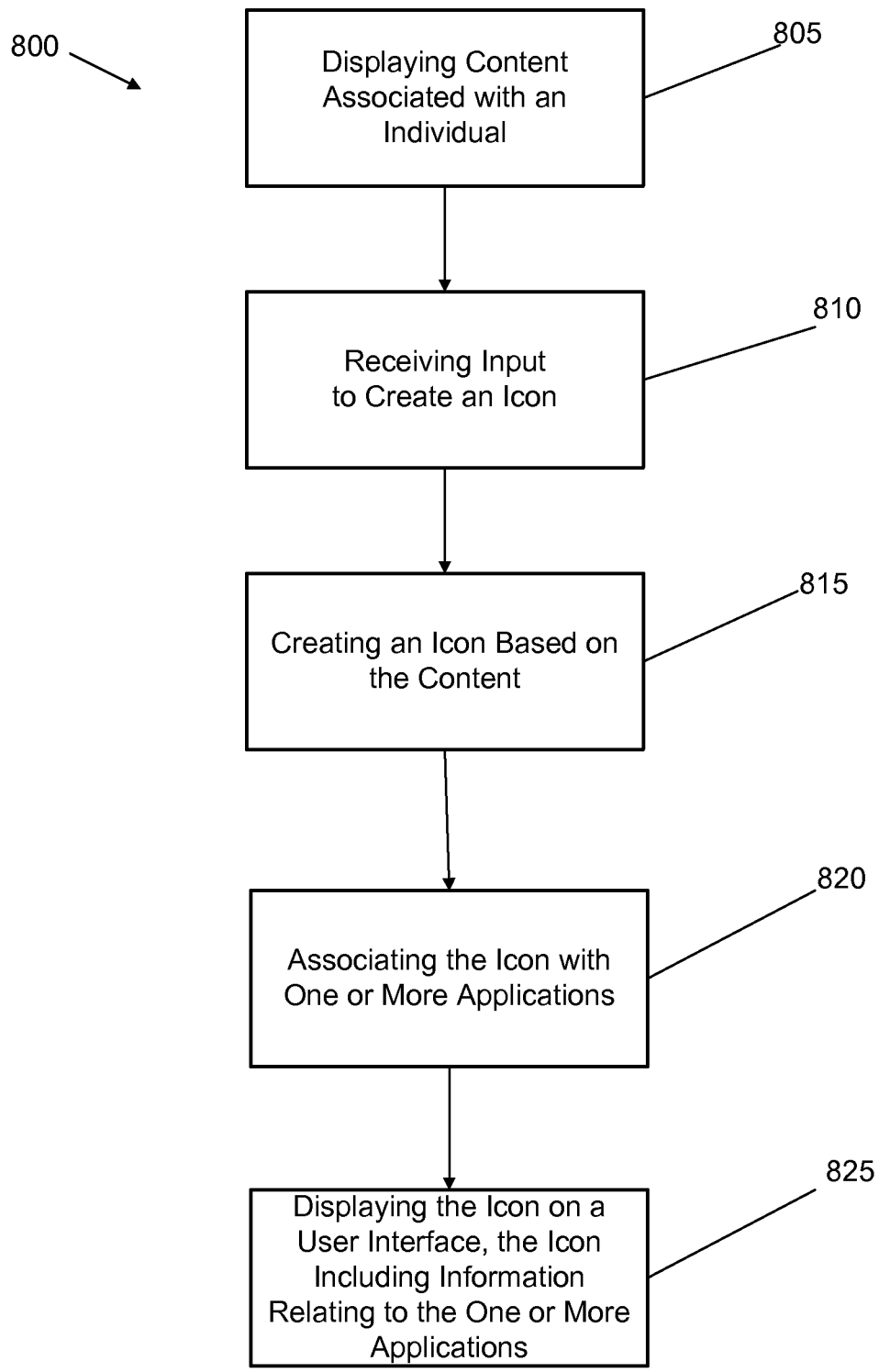
FIG. 8 is another flow diagram of a process for creating icons for content.

FIG. 8 is another flow diagram of a process for creating icons for content. The process 800 begins when content associated with an individual is displayed on the mobile device (805). The content can be included in a contact that is stored in an address book, for example. The individual can be associated with one or more applications (e.g., an SMS application).

An input to create an icon associated with the contact is received (810). The input can be the user selecting a user interface element that is presented proximate to the contact content. The input can cause an an option pane to be presented to the user for allowing the user to select an option to create an icon associated with the contact. The icon can be created based on the content (815). In one implementation, the content to be rendered into the icon can be captured as an image (e.g., such as a bitmap) and then scaled to fit the dimensions of the icon.

The icon can be associated with the one or more applications (820). The applications can be personalized to the user. For example, selecting the icon can cause applications or specific functions of the applications associated with the individual, to be available to the user, such that the user can interact with them. The icon can be displayed on a user interface of the mobile device (825). The display can also include information relating to the one or more applications associated with the user.

In some implementations, applications associated with an icon can utilize an Application Programming Interface (API). Applications can use the API to hook into third party services, including but not limited to: MySpace™, FaceBook™, etc., so that users can indicate that they have the contact's information for these services or applications. Once entered, users would have the option to add these services to their contacts (e.g., add to a button bar) for quick navigation and status updates. In another implementation, a shortcut (e.g., an icon or link) can be provided to third party services. The advantages to the API and shortcut is individual contact status and a navigation shortcut, respectively.

Example Temporary Icon Creation Process

Figure 9:
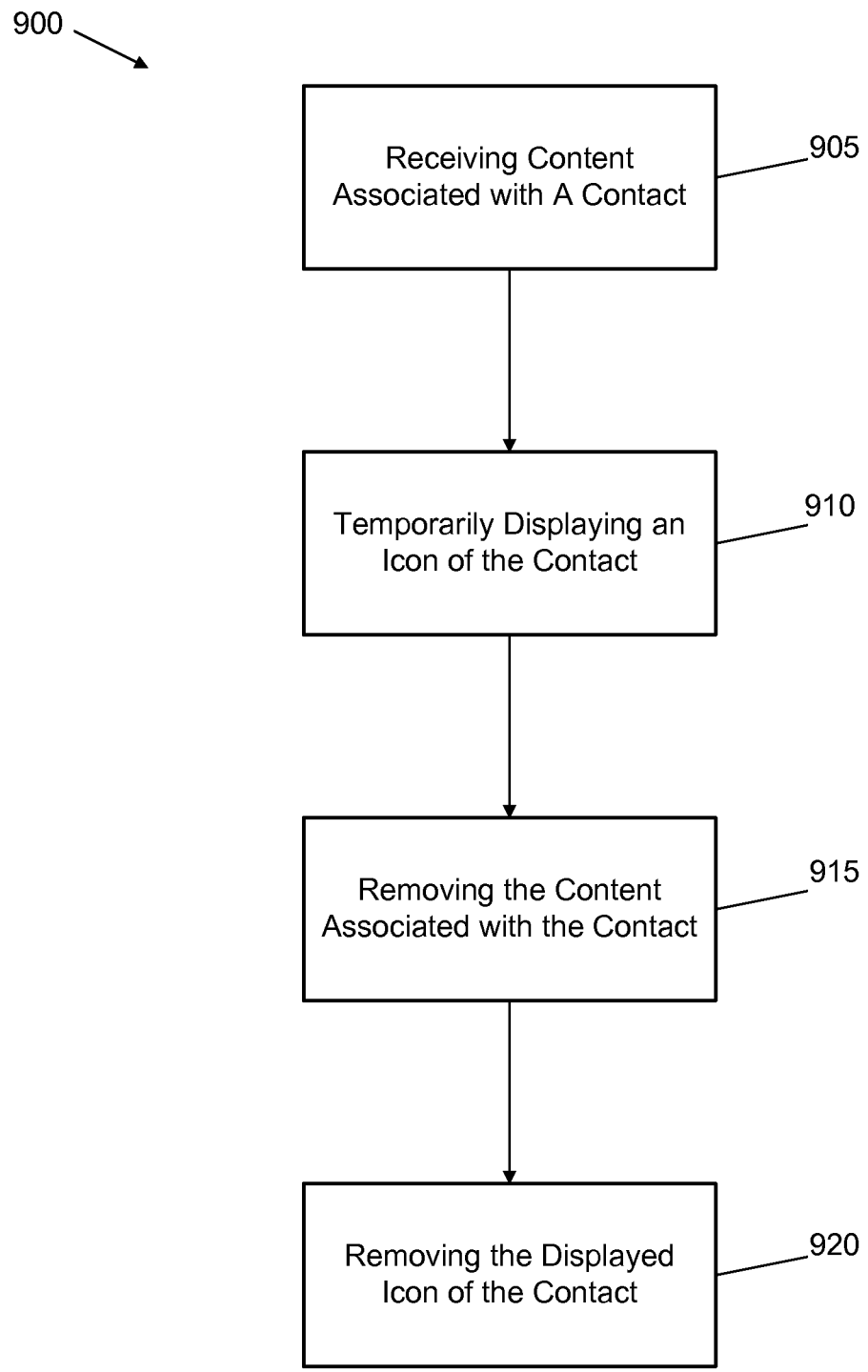
FIG. 9 is a flow diagram of a process for interacting with temporary icons for content.

FIG. 9 is a flow diagram of a process 900 for creating icons for content. The process 900 begins when content of a contact is received on the mobile device (905). In some implementations, this content can be received when the mobile device is within the proximity of a particular location associated with the contact. An input to create an icon associated with the contact can be received. The input can be the user selecting a user interface element that is presented proximate to the contact content. The input can cause an option pane to be presented to the user, allowing the user to select an option to create an icon associated with the contact. A portion of the content can be rendered into the icon. In one implementation, the content to be rendered into the icon may be captured as an image and scaled to fit the dimensions of the icon.

The icon can be temporarily displayed on a user interface of the mobile device (910). The user can interact with the contact when the icon is displayed upon the mobile device. The content associated with the contact can be removed from the mobile device (915) when the mobile device is not within the proximity of a particular location associated with the contact. Additionally, the icon associated with the contact can be removed from the mobile device (920).

Example Network Operating Environment

Figure 10:
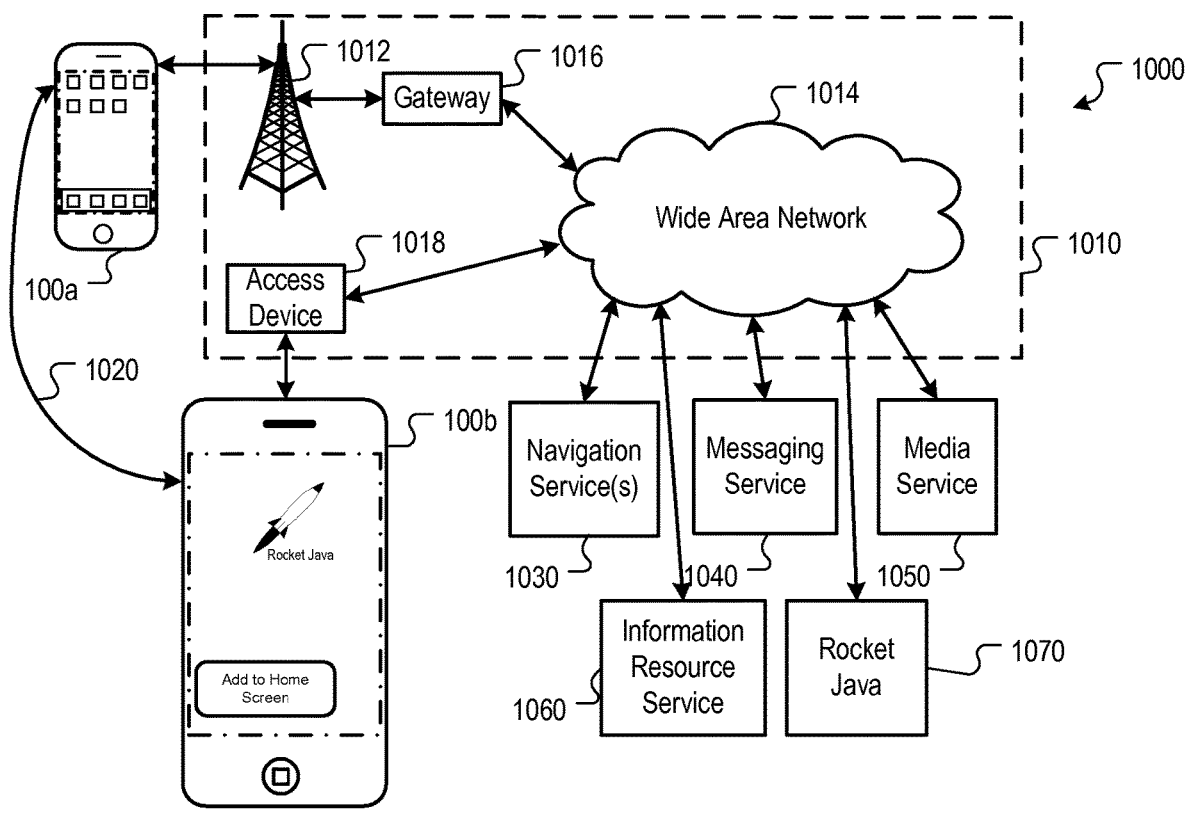
FIG. 10 is a block diagram of an example of a mobile device operating environment.

FIG. 10 is a block diagram 1000 of an example of a mobile device operating environment. The mobile device 100 of FIG. 1 can, for example, communicate over one or more wired and/or wireless networks 1010 in data communication. For example, a wireless network 1012 (e.g., a cellular network), can communicate with a wide area network (WAN) 1014, such as the Internet, by use of a gateway 1016. Likewise, an access point 1018, such as an 802.11g wireless access point, can provide communication access to the wide area network 1014. In some implementations, both voice and data communications can be established over the wireless network 1012 and the access point 1018. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 1012, gateway 1016, and wide area network 1014 (e.g., using TCP/IP or UDP protocols). Likewise, the mobile device 100b can place and receive phone calls, send and receive e-mail messages, and retrieve electronic documents over the access point 1018 and the wide area network 1014. In some implementations, the mobile device 100 can be physically connected to the access point 1018 using one or more cables and the access point 1018 can be a personal computer. In this configuration, the mobile device 100 can be referred to as a "tethered" device.

The mobile devices 100a and 100b can also establish communications by other means (e.g., wireless communications). For example, the mobile device 100a can communicate with other mobile devices (e.g., other wireless devices, cell phones, etc.), over the wireless network 1012. Likewise, the mobile devices 100a and 100b can establish peer-to-peer communications 1020 (e.g., a personal area network), by use of one or more communication subsystems (e.g., a Bluetooth™ communication device). Other communication protocols and topologies can also be implemented.

The mobile device 100 can, for example, communicate with one or more services 1030, 1040, 1050, 1060, and 1070 over the one or more wired and/or wireless networks 1010. For example, a navigation service 1030 can provide navigation information (e.g., map information, location information, route information, and other information), to the mobile device 100.

A messaging service 1040 can, for example, provide e-mail and/or other messaging services. A media service 1050 can, for example, provide access to media files, such as song files, movie files, video clips, and other media data. A syncing service 1060 can, for example, perform syncing services (e.g., sync files). An activation service 1070 can, for example, perform an activation process for activating the mobile device 100. Other services can also be provided, including a software update service that automatically determines whether software updates exist for software on the mobile device 100, then downloads the software updates to the mobile device 100 where it can be manually or automatically unpacked and/or installed.

The mobile device 100 can also access other data and content over the one or more wired and/or wireless networks 1010. For example, content publishers 1070, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114 depicted in FIG. 1. In the example shown, a user of the mobile device 100b has invoked an icon functionality (e.g., by pressing the icon object 116 on the top-level graphical user interface shown in FIG. 1), and has requested and received the contact associated with the "Mike J." icon.

Example Mobile Device Architecture

Figure 11:
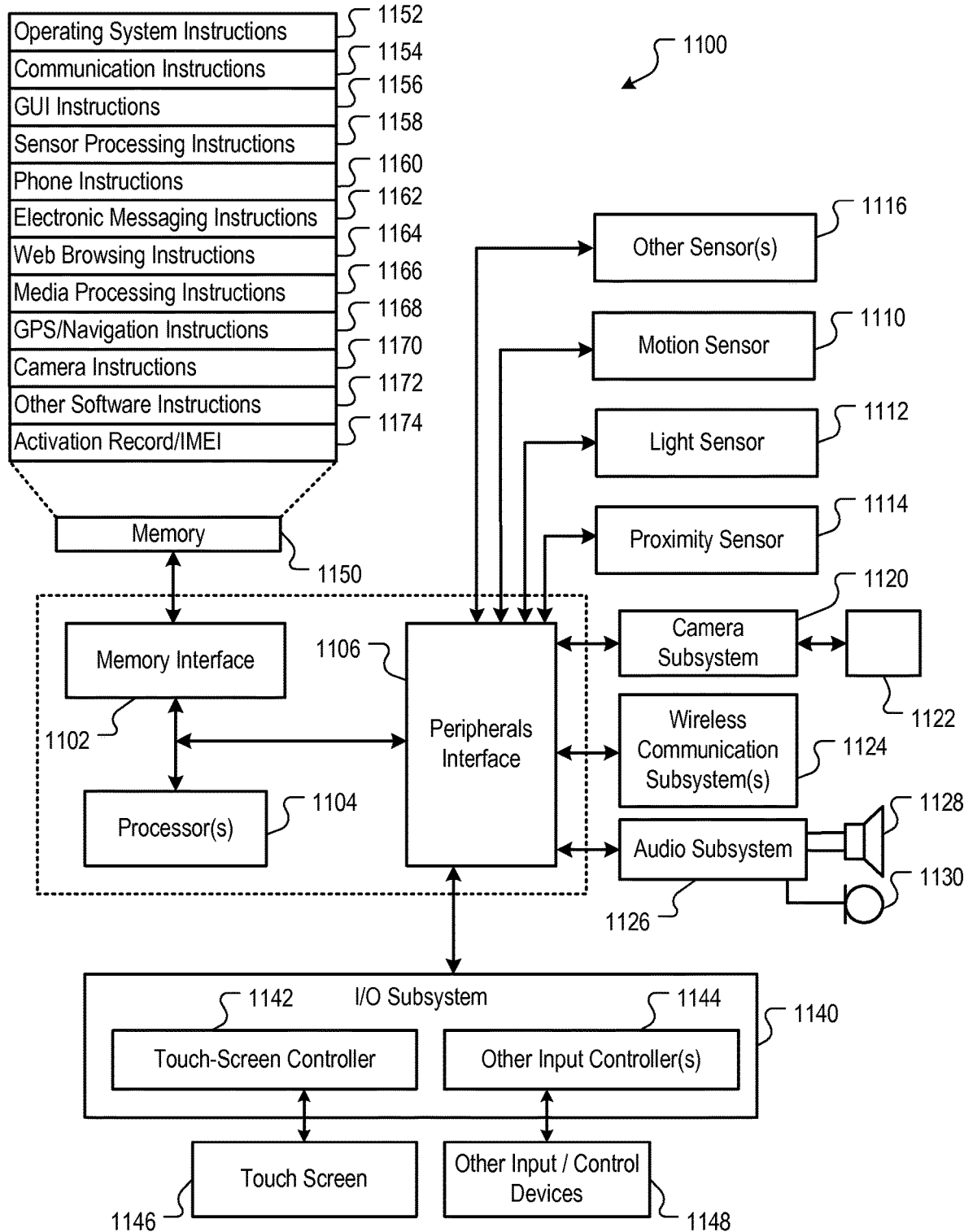
FIG. 11 is a block diagram of an example implementation of the mobile device of FIG. 1.

FIG. 11 is a block diagram 1100 of an example implementation of the mobile device 100 of FIG. 1. The mobile device 100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the mobile device 100 can be coupled by one or more communication buses or signal lines.

Sensors, devices and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting and proximity functions. Other sensors 1116 can also be connected to the peripherals interface 1106, such as a positioning system (e.g., GPS receiver), a temperature sensor, a biometric sensor, or other sensing device, to facilitate related functionalities.

A camera subsystem 1120 and an optical sensor 1122 (e.g., a charged coupled device (CCD) or a complementary metal-oxide semiconductor (CMOS) optical sensor), can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the mobile device 100 is intended to operate. For example, a mobile device 100 may include communication subsystems 1124 designed to operate over a GSM network, a GPRS network, an EDGE network, a Wi-Fi or WiMax network, and a Bluetooth™ network. In particular, the wireless communication subsystems 1124 may include hosting protocols such that the device 100 may be configured as a base station for other wireless devices.

An audio subsystem 1126 can be coupled to a speaker 1128 and a microphone 1130 to facilitate voice-enabled functions, such as voice recognition, voice replication, digital recording, and telephony functions.

The I/O subsystem 1140 can include a touch screen controller 1142 and/or other input controller(s) 1144. The touch-screen controller 1142 can be coupled to a touch screen 1146. The touch screen 1146 and touch screen controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration may disengage a lock of the touch screen 1146; and a pressing of the button for a second duration that is longer than the first duration may turn power to the mobile device 100 on or off. The user may be able to customize a functionality of one or more of the buttons. The touch screen 1146 can, for example, also be used to implement virtual or soft buttons and/or a keypad or keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 30-pin dock connector that is compatible with the iPod. Other input/output and control devices can also be used.

The memory interface 1102 can be coupled to memory 1150. The memory 1150 can include high-speed random access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks. The operating system 1152 may include instructions for handling basic system services and for performing hardware dependent tasks.

The memory 1150 may also store communication instructions 1154 to facilitate communicating with one or more additional devices, one or more computers and/or one or more servers. The memory 1150 may include graphical user interface instructions 1156 to facilitate graphic user interface processing. For example, the graphical user interfaces described with respect to FIGS. 1-6B can be implemented with graphic user interface instructions 1156. The memory 1150 may also include sensor processing instructions 1158 to facilitate sensor-related processing and functions; phone instructions 1160 to facilitate phone-related processes and functions; electronic messaging instructions 1162 to facilitate electronic-messaging related processes and functions;

web browsing instructions 1164 to facilitate web browsing-related processes and functions; media processing instructions 1166 to facilitate media processing-related processes and functions; GPS/Navigation instructions 1168 to facilitate GPS and navigation-related processes and instructions; camera instructions 1170 to facilitate camera-related processes and functions; and/or other icon process instructions 1172 to facilitate processes and functions, as described in reference to FIGS. 1-6B.

Each of the above identified instructions and applications can correspond to a set of instructions for performing one or more functions described above. These instructions need not be implemented as separate software programs, procedures or modules. The memory 1150 can include additional instructions or fewer instructions. Furthermore, various functions of the mobile device 100 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described feature s can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:
1. A method, comprising:
at an electronic device in communication with a display and one or more input devices:
while displaying a home screen user interface of the electronic device, including a plurality of respective user interface objects of a first type, including a third user interface object of the first type that when activated causes the electronic device to display an application user interface, different from the home screen user interface, corresponding to the third user interface object, determining a context of the electronic device based on at least a location of the electronic device;
in response to determining the context of the electronic device:
in accordance with a determination that the context of the electronic device meets a first set of criteria:
concurrently displaying, on the display, in the home screen user interface of the electronic device:
a first user interface object of a second type, different from the first type, associated with a first entity; and
the plurality of respective user interface objects of the first type;
receiving, via the one or more input devices, an indication of a selection of the first user interface object associated with the first entity; and
in response to receiving the indication of the selection of the first user interface object asso- ciated with the first entity, displaying, on the display, information associated with the first entity;
while displaying the first user interface object, in accordance with a determination that the context of the electronic device no longer meets the first set of criteria, ceasing the display of the first user interface object; and
in accordance with a determination that the context of the electronic device meets a second set of criteria:
concurrently displaying, on the display, in the home screen user interface of the electronic device:
a second user interface object of the second type, different from the first type, associated with a second entity; and
the plurality of respective user interface objects of the first type;
receiving, via the one or more input devices, an indication of a selection of the second user interface object associated with the second entity; and
in response to receiving the indication of the selection of the second user interface object associated with the second entity, displaying, on the display, information associated with the second entity.

2. The method of claim 1, wherein:
the first set of criteria comprise determining that a location of the electronic device is within a threshold distance of a location of the first entity.

3. The method of claim 1, wherein:
the first set of criteria comprise determining that a setting is active on the electronic device, wherein the setting enables the electronic device to display the first user interface object in accordance with the determination that the context of the electronic device meets the first set of criteria.

4. The method of claim 1, wherein:
displaying the information associated with the first entity comprises displaying the information associated with the first entity in a first user interface, different from the application user interface, of the electronic device.

5. The method of claim 1, wherein:
displaying the first user interface object associated with the first entity comprises displaying the first user interface object in a region of a user interface presented on the electronic device that is dedicated for temporary user interface objects.

6. The method of claim 1, wherein the first user interface object is a first temporary icon and the second user interface object is a second temporary icon.

7. The method of claim 1, further comprising:
while displaying the second user interface object, in accordance with a determination that the context of the electronic device no longer meets the second set of criteria, ceasing the display of the second user interface object.

8. The method of claim 1, wherein:
in accordance with the determination that the context of the electronic device meets the second set of criteria:
the second user interface object associated with the second entity is concurrently displayed with the plurality of respective user interface objects in the home screen user interface of the electronic device.

9. An electronic device comprising:
one or more processors;
memory; and
one or more programs, wherein the one or more programs are stored in the memory and configured to be executed by the one or more processors, the one or more programs including instructions for:
while displaying a home screen user interface of the electronic device, including a plurality of respective user interface objects of a first type, including a third user interface object of the first type that when activated causes the electronic device to display an application user interface, different from the home screen user interface, corresponding to the third user interface object, determining a context of the electronic device based on at least a location of the electronic device;
in response to determining the context of the electronic device:
in accordance with a determination that the context of the electronic device meets a first set of criteria:
concurrently displaying, on a display, in the home screen user interface of the electronic device:
a first user interface object of a second type, different from the first type, associated with a first entity; and
the plurality of respective user interface objects of the first type;
receiving, via one or more input devices, an indication of a selection of the first user interface object associated with the first entity; and
in response to receiving the indication of the selection of the first user interface object associated with the first entity, displaying, on the display, information associated with the first entity;
while displaying the first user interface object, in accordance with a determination that the context of the electronic device no longer meets the first set of criteria, ceasing the display of the first user interface object; and
in accordance with a determination that the context of the electronic device meets a second set of criteria:
concurrently displaying, on the display, in the home screen user interface of the electronic device:
a second user interface object of the second type, different from the first type, associated with a second entity; and
the plurality of respective user interface objects of the first type;
receiving, via the one or more input devices, an indication of a selection of the second user interface object associated with the second entity; and
in response to receiving the indication of the selection of the second user interface object associated with the second entity, displaying, on the display, information associated with the second entity.

10. The electronic device of claim 9, wherein:
the first set of criteria comprise determining that a location of the electronic device is within a threshold distance of a location of the first entity.

11. The electronic device of claim 9, wherein:
the first set of criteria comprise determining that a setting is active on the electronic device, wherein the setting enables the electronic device to display the first user interface object in accordance with the determination that the context of the electronic device meets the first set of criteria.

12. The electronic device of claim 9, wherein:

displaying the information associated with the first entity comprises displaying the information associated with the first entity in a first user interface, different from the application user interface, of the electronic device.

13. The electronic device of claim 9, wherein:
displaying the first user interface object associated with the first entity comprises displaying the first user interface object in a region of a user interface presented on the electronic device that is dedicated for temporary user interface objects.

14. A non-transitory computer readable storage medium storing one or more programs, the one or more programs comprising instructions, which when executed by one or more processors of an electronic device, cause the electronic device to:
while displaying a home screen user interface of the electronic device, including a plurality of respective user interface objects of a first type, including a third user interface object of the first type that when activated causes the electronic device to display an application user interface, different from the home screen user interface, corresponding to the third user interface object, determine a context of the electronic device based on at least a location of the electronic device;
in response to determining the context of the electronic device:
in accordance with a determination that the context of the electronic device meets a first set of criteria:
concurrently display, on a display, in the home screen user interface of the electronic device:
a first user interface object of a second type, different from the first type, associated with a first entity; and
the plurality of respective user interface objects of the first type;
receive, via one or more input devices, an indication of a selection of the first user interface object associated with the first entity; and
in response to receiving the indication of the selection of the first user interface object associated with the first entity, display, on the display, information associated with the first entity;
while displaying the first user interface object, in accordance with a determination that the context of the electronic device no longer meets the first set of criteria, cease the display of the first user interface object; and
in accordance with a determination that the context of the electronic device meets a second set of criteria:
concurrently display, on the display, in the home screen user interface of the electronic device:
a second user interface object of the second type, different from the first type, associated with a second entity; and
the plurality of respective user interface objects of the first type;
receive, via the one or more input devices, an indication of a selection of the second user interface object associated with the second entity; and
in response to receiving the indication of the selection of the second user interface object associated with the second entity, display, on the display, information associated with the second entity.

15. The non-transitory computer readable storage medium of claim 14, wherein:
the first set of criteria comprise determining that a location of the electronic device is within a threshold distance of a location of the first entity.

16. The non-transitory computer readable storage medium of claim 14, wherein:
the first set of criteria comprise determining that a setting is active on the electronic device, wherein the setting enables the electronic device to display the first user interface object in accordance with the determination that the context of the electronic device meets the first set of criteria.

17. The non-transitory computer readable storage medium of claim 14, wherein:
displaying the information associated with the first entity comprises displaying the information associated with the first entity in a first user interface, different from the application user interface, of the electronic device.

18. The non-transitory computer readable storage medium of claim 14, wherein:
displaying the first user interface object associated with the first entity comprises displaying the first user interface object in a region of a user interface presented on the electronic device that is dedicated for temporary user interface objects.

* * * * *